US012724972B2

(12) United States Patent
Salustino Guimaraes et al.

(10) Patent No.: US 12,724,972 B2
(45) Date of Patent: Sep. 1, 2026

(54) AUTOMATIC SENTENCE CONDITION MATCHING USING NATURAL LANGUAGE PROCESSING

(71) Applicant: International Business Machines Corporation, Armonk, NY (US)

(72) Inventors: Valdir Salustino Guimaraes, Sao Paulo (BR); Angelo Moore, Dunboyne (IE); Rodrigo Reis Alves, São Paulo (BR); Vasanthi M. Gopal, Plainsboro, NJ (US); Daniela Arrigoni, Seregno (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 18/471,787

(22) Filed: Sep. 21, 2023

(65) Prior Publication Data

US 2025/0103819 A1 Mar. 27, 2025

(51) Int. Cl.
*G06F 17/00* (2019.01)
*G06F 40/205* (2020.01)
(Continued)

(52) U.S. Cl.
CPC ............ *G06F 40/30* (2020.01); *G06F 40/205* (2020.01); *G06F 40/242* (2020.01); *G06F 40/279* (2020.01)

(58) Field of Classification Search
CPC ...... G06F 40/30; G06F 40/205; G06F 40/242; G06F 40/279; G06F 40/295
(Continued)

(56) References Cited

U.S. PATENT DOCUMENTS 6,810,376 B1 10/2004 Guan et al.
6,934,715 B2 8/2005 Kalmes et al.
(Continued)

FOREIGN PATENT DOCUMENTS

CN 112287668 A 1/2021

OTHER PUBLICATIONS

BM25 Wikipedia page available at least Apr. 2023 (Year: 2023).*
(Continued)

*Primary Examiner* — Paul C Mccord
(74) *Attorney, Agent, or Firm* — Amin, Turocy & Watson, LLP

(57) ABSTRACT

One or more systems, devices, computer program products and/or computer-implemented methods of use provided herein relate to automatic sentence condition matching using natural language processing (NLP). The computer-implemented system can comprise a memory that can store computer-executable components and a processor that can execute the computer-executable components, wherein the computer-executable components can comprise an extraction module that can use a probabilistic relevance weighting model to retrieve a first sentence from a document by computing a normalized relevance score of the first sentence based on a relevance weighting score of a second sentence from a dictionary of query sentences. The computer-executable components can further comprise a resolution module that can use a set of NLP rules and a linguistic dictionary to automatically identify whether the first sentence and the second sentence have a same meaning based on the normalized relevance score being above a defined threshold.

20 Claims, 11 Drawing Sheets

(51) Int. Cl.
*G06F 40/242* (2020.01)
*G06F 40/279* (2020.01)
*G06F 40/30* (2020.01)

(58) Field of Classification Search
USPC .............................................................. 704/9
See application file for complete search history.

(56) References Cited

U.S. PATENT DOCUMENTS

| | | | | |
|---|---|---|---|---|
| 8,170,969 | B2 | 5/2012 | Roettger et al. | |
| 8,200,477 | B2 | 6/2012 | Yi et al. | |
| 9,805,025 | B2 | 10/2017 | Gidney | |
| 10,395,325 | B2 | 8/2019 | Takuma et al. | |
| 11,625,421 | B1 | 4/2023 | Finkenberg | |
| 2004/0019578 | A1 | 1/2004 | Kalmes et al. | |
| 2005/0091038 | A1 | 4/2005 | Yi et al. | |
| 2010/0042576 | A1 | 2/2010 | Roettger et al. | |
| 2011/0055206 | A1 | 3/2011 | Martin et al. | |
| 2014/0122383 | A1* | 5/2014 | Shen | A63F 13/30 706/12 |
| 2015/0161102 | A1 | 6/2015 | Gidney | |
| 2016/0132589 | A1* | 5/2016 | Nolan | G06F 16/335 707/728 |
| 2017/0017641 | A1 | 1/2017 | Gidney | |
| 2017/0132730 | A1 | 5/2017 | Takuma et al. | |
| 2018/0011860 | A1* | 1/2018 | Barhate | G06F 16/41 |
| 2022/0284194 | A1* | 9/2022 | Galitsky | G06F 40/35 |
| 2025/0061280 | A1* | 2/2025 | Yan | G06F 40/35 |

OTHER PUBLICATIONS

Robertson, S.E. et al. | "Relevance weighting of search terms." Journal of the American Society for Information Science, vol. 27, Issue 3 p. 129-146, First published: May/Jun. 1976, https://doi.org/10.1002/asi.4630270302, 18 pages.

Wikipedia | "Evaluation measures (information retrieval)." On-line article, last accessed Aug. 3, 2023, 8 pages.

Princeton University | "What is WordNet?" On-line publication, last accessed Aug. 3, 2023, 2 pages.

Martinez, J. et al. | "Long-span clause extraction for Legal NLP usingQ&A and Automatic Prompt generation." On-line publication John Snow Labs, last accessed Jun. 5, 2023, 27 pages.

Scikit-Learn | "sklearn.feature_extraction.text.CountVectorizer." On-line version of scikit-learn 1.3.0, https://scikit-learn.org/stable/modules/generated/sklearn.feature_extraction.text.CountVectorizer.html#sklearn.feature_extraction.text.CountVectorizer, last accessed Sep. 18, 2023, 7 pages.

Sarkar, D. | "Text Similarity and Clustering." In: Text Analytics with Python. Apress, Berkeley, CA, https://doi.org/10.1007/978-1-4842-4354-1_7. First published online May 22, 2019, 688 pages.

* cited by examiner

800

| | | | |
|---|---|---|---|
| CLIENT WILL PROVIDE AFTER-HOURS ACCESS TO CLIENT FACILITIES | CLIENT WILL PROVIDE AFTER-HOURS ACCESS TO CLIENT FACILITIES | **IF NECESSARY**, CLIENT WILL PROVIDE AFTER-HOURS ACCESS TO CLIENT FACILITIES | ✓ |
| REVIEW WITH THE PROJECT MANAGER ANY CLIENT INVOICE/BILLING REQUIREMENTS | REVIEW WITH THE PROJECT MANAGER ANY CLIENT INVOICE/BILLING REQUIREMENTS | REVIEW WITH THE PROJECT MANAGER ANY CLIENT INVOICE/BILLING REQUIREMENTS | ✓ |
| REVIEW WITH THE PROJECT MANAGER ANY CLIENT INVOICE/BILLING REQUIREMENTS | REVIEW WITH THE PROJECT MANAGER ~~ANY~~ CLIENT INVOICE/BILLING ~~REQUIREMENTS~~ | REVIEW THE **STANDARD** INVOICE **FORMAT AND** BILLING **PROCEDURE TO BE USED ON** A PROJECT WITH THE CLIENT PROJECT MANAGER | ⚠ |

FIG. 8A

AUTOMATIC SENTENCE CONDITION MATCHING USING NATURAL LANGUAGE PROCESSING

BACKGROUND

The subject disclosure relates to machine learning, and more specifically to automatic sentence condition matching using natural language processing (NLP).

NLP is a machine learning technology that can allow computers to analyze and manipulate human language. NLP can be used to retrieve sentences from one or more documents, based on similarity of the sentences to a query sentence. Some NLP engines can rely on an exact match to retrieve target sentences from a document based on similarity of the target sentences to a query sentence. However, highly similar sentences can be dissimilar in meaning, and dissimilar looking sentences can have the same meaning, requiring some existing information extraction systems to rely on user interaction, user input, and/or configuration to assert that a standard condition or standard clause is present in a document. Using similarity and NLP to automatically retrieve target sentences from a document can be desirable.

The above-described background description is merely intended to provide a contextual overview regarding NLP for matching sentences having the same meaning, and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable automatic sentence condition matching using natural language processing are discussed.

According to an embodiment, a system is provided. The system can comprise a memory that can store computer-executable components and a processor that can execute the computer-executable components stored in the memory, where the computer-executable components can comprise an extraction module that can use a probabilistic relevance weighting model to retrieve a first sentence from a document by computing a normalized relevance score of the first sentence based on a relevance weighting score of a second sentence from a dictionary of query sentences. The computer-executable components can further comprise a resolution module that can use a set of NLP rules and a linguistic dictionary to automatically identify whether the first sentence and the second sentence have a same meaning based on the normalized relevance score being above a defined threshold. Such embodiments of the system can provide a number of advantages, including that the system can automatically assert, using a machine learning model having accuracy above a defined threshold, whether standard terms, standard clauses, or standard conditions are present in a document. That is, the system can detect presence or absence of standard terms, standard clauses, or standard conditions in a document based on a query term, without needing human supervision, where the standard terms, standard clauses, or standard conditions can have the same meaning as the query term.

In one or more embodiments of the aforementioned system, retrieving the first sentence from the document can comprise inverse document frequency, and the probabilistic relevance weighting model can be a sentence ranking and retrieval function that can consider a distribution of index words of a sentence for retrieving the first sentence. In one or more embodiments of the aforementioned system, the defined threshold can be defined by mining similar sentences from the document and the dictionary of query sentences, annotating one or more pairs of relevant sentences and measuring a fall-out metric defined as a proportion of non-relevant documents retrieved out of non-relevant documents available. In one or more embodiments of the aforementioned system, a verb polarity module can detect verb polarities in the first sentence and the second sentence to assert for changes in the verb polarities. In one or more embodiments of the aforementioned system, a logic comparison module can use the linguistic dictionary to identify intention changes in the first sentence and the second sentence when the first sentence and the second sentence respectively comprise same amounts of verbs, adverbs, and adjectives, where the linguistic dictionary can be a dictionary of antonyms and synonyms. In one or more embodiments of the aforementioned system, an NLP parser can use the set of NLP rules to generate a result encoded in an array of Booleans indicating whether a first condition in the first sentence matches a second condition in the second sentence. Such embodiments of the system can provide a number of advantages, including that the system can assert, using a machine learning model having accuracy above a defined threshold, whether standard terms, standard clauses, or standard conditions are present in a document, without relying on human supervision and without relying on an exact match between the standard terms, standard clauses, or standard conditions and a query term.

According to another embodiment, a computer-implemented method is provided. The computer-implemented method can comprise retrieving, by a system operatively coupled to a processor, using a probabilistic relevance weighting model during an extraction phase, a first sentence from a document by computing a normalized relevance score of the first sentence based on a relevance weighting score of a second sentence from a dictionary of query sentences. The computer-implemented method can further comprise identifying, by the system, using a set of NLP rules and a linguistic dictionary during a resolution phase, whether the first sentence and the second sentence have a same meaning based on the normalized relevance score being above a defined threshold, where the identifying can be automatic. Such embodiments of the computer-implemented method can provide a number of advantages, including automatic assertion of standard terms, standard clauses, or standard conditions in a document, using a machine learning model having accuracy above a defined threshold. That is, the computer-implemented method can detect presence or absence of standard terms, standard clauses, or standard conditions in a document based on a query term, without needing human supervision, where the standard terms, standard clauses, or standard conditions can have the same meaning as the query term.

In one or more embodiments of the aforementioned computer-implemented method, the retrieving the first sentence from the document can comprise inverse document frequency, and the probabilistic relevance weighting model can be a sentence ranking and retrieval function that can consider a distribution of index words of a sentence for retrieving the first sentence. In one or more embodiments of the aforementioned computer-implemented method, the defined threshold can be defined by mining similar sentences from the document and the dictionary of query sentences, annotating one or more pairs of relevant sentences and measuring a fall-out metric defined as a proportion of non-relevant documents retrieved out of non-relevant documents available. One or more embodiments of the aforementioned computer-implemented method can comprise detecting, by the system, verb polarities in the first sentence and the second sentence to assert for changes in the verb polarities. One or more embodiments of the aforementioned computer-implemented method can comprise identifying, by the system, using the linguistic dictionary, intention changes in the first sentence and the second sentence when the first sentence and the second sentence respectively comprise same amounts of verbs, adverbs, and adjectives, where the linguistic dictionary can be a dictionary of antonyms and synonyms. One or more embodiments of the aforementioned computer-implemented method can comprise generating, by the system, using the set of NLP rules, a result encoded in an array of Booleans indicating whether a first condition in the first sentence matches a second condition in the second sentence. Such embodiments of the computer-implemented method can provide a number of advantages, including assertion of standard terms, standard clauses, or standard conditions in a document, using a machine learning model having accuracy above a defined threshold, without relying on human supervision and without relying on the standard terms, standard clauses, or standard conditions being an exact match to a query term.

According to yet another embodiment, a computer program product for programmatic assertion of a standard condition search is provided. The computer program product can comprise a computer readable storage medium having program instructions embodied therewith, the program instructions executable by a processor to cause the processor to retrieve, by the processor, using a probabilistic relevance weighting model during an extraction phase, a first sentence from a document by computing a normalized relevance score of the first sentence based on a relevance weighting score of a second sentence from a dictionary of query sentences. The program instructions can be further executable by the processor to identify, by the processor, using a set of NLP rules and a linguistic dictionary during a resolution phase, whether the first sentence and the second sentence have a same meaning based on the normalized relevance score being above a defined threshold, where the identifying can be automatic. Such embodiments of the computer-program product can provide a number of advantages, including automatic assertion of standard terms, standard clauses, or standard conditions in a document, based on a machine learning model having accuracy above a defined threshold. That is, the computer-program product can detect presence or absence of standard terms, standard clauses, or standard conditions in a document based on a query term, without needing human supervision and without relying on the standard terms, standard clauses, or standard conditions being an exact match to the query term, where the standard terms, standard clauses, or standard conditions can have the same meaning as the query term.

BRIEF DESCRIPTION OF THE DRAWINGS

One or more embodiments are described below in the Detailed Description section with reference to the following drawings:

FIG. 8A illustrates an example, non-limiting representation of a Boolean array indicating whether two sentences are a semantic match in accordance with one or more embodiments described herein.

DETAILED DESCRIPTION

Figure 1:
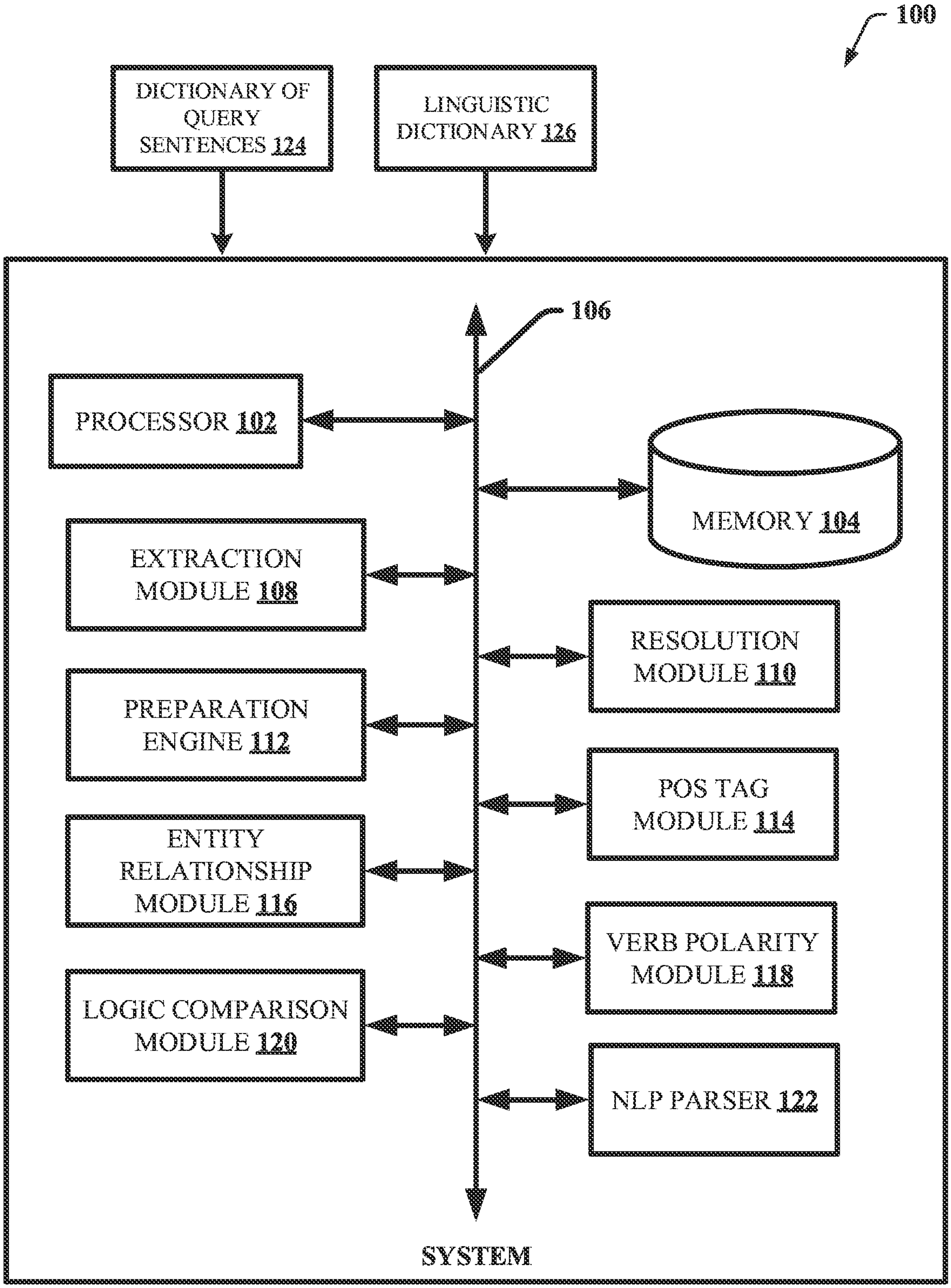
FIG. 1 illustrates a block diagram of an example, non-limiting system that can automatically assert whether standard conditions are present in a document by using similarity and NLP in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In the domain of contracts, an automatic determination of presence of standard clause conditions can be desirable to allow users to automatically assert that a specific meaning or a specific condition represented by a standard clause is present in a contract. For example, a contract lifecycle management (CLM) system for a large company can aim to automatically scan a corpus of contracts, retrieve all contracts comprising a particular condition and tag the contracts as approved for the condition. Existing natural language solutions can support users to search for standard clauses and/or for semantic searching. However, many of the existing solutions can rely on user input and user supervision over results identified by a system, to assert that a clause and/or standard conditions represented by the clause are present in a contract. Further, some existing solutions can rely on an exact match (trivial solution) between sentences, whereas other approaches towards identification of standard conditions in a contract can involve a search using a similarity algorithm. Fussy matching using similarity, for example, cosine similarity (embedding) can also be used in some existing techniques. However, similarity between two sentences can still cause the two sentences to differ in meaning. As stated earlier, many of the existing solutions can rely on human supervision and user interaction to confirm that results identified by a system contain standard conditions represented by a clause. Thus, systems and methods that can automatically identify sentences with the same meaning, despite the sentences being constructed differently or that can identify whether sentences being compared are different in meaning despite the sentences having high similarity can be desirable.

Various embodiments of the present disclosure can be implemented to produce a solution to these problems. Embodiments described herein include systems, computer-implemented methods, and computer program products that can perform automatic sentence condition matching using similarity and NLP. In a document or a corpus of documents, clauses can be made up of individual sentences. For example, a single statement can comprise a full condition for a clause. Various embodiments discussed herein can provide an automatic assertion search engine that can process a contract and detect whether the contract has certain clauses. Further the automatic assertion search engine can automatically assert presence of standard conditions in a document, without requiring an exact match between query sentences and clauses in the document, and the automatic assertion search engine can automatically alert users of absence of the standard conditions in the document. An exemplary use case of the various embodiments discussed herein can be a review phase of a contract agreement where a reviewer new to the field can scan the contract agreement using the tool (e.g., the automatic assertion search engine) and the tool can automatically assert and identify mandatory clause conditions that can be present and/or missing from the contract agreement.

In various embodiments, a system can be designed to have an architecture comprising two phases, an extraction phase, and a resolution phase. The extraction phase can utilize a relevance score metric comprising a custom-made normalized relevance score based on an Okapi BM25 ranking score and the resolution phase can be based on a sentence parser to assert for predicative changes and negation identification, wherein the system can expand semantic analysis for final assertion of a condition match using a knowledge-based logic. The extraction phase can be backed by a dictionary of standard terms and variations of the standard terms (e.g., terms having the same meaning), and the resolution phase can rely on a linguistic dictionary of synonyms and antonyms. The extraction phase can embed the custom-made normalized relevance score based on the Okapi BM25 information retrieval metric modified to be normalized from zero (0) to 1. The resolution phase can comprise an NLP parser and a set of NLP rules that can assert meaning of a sentence based on the number of POS tag entities, verb polarity changes, and a word changing to its antonym based on a synonym/antonym search mechanism. That is, the NLP rules can make assertions based on the number of target POS tag entities (e.g., number of verbs, adverbs, adjectives, etc.), a change of intention due to a verb polarity change and a change of intention due to a synonym/antonym change of a word, and further based on a dictionary schema with term variations, a method for searching for an antonym of a word in a synonym/antonym net (e.g., a synonym-of-synonym-to-antonym net) and a parser module that can take into consideration the steps mentioned heretofore to provide a final assertion upon a sentence condition match. An outcome of the system can be an automatic matching of standard conditions (e.g., mandatory clauses in an agreement) present in a document based on a query term and an alert, for example, to a system user, in case of the standard conditions being absent from the document.

More specifically, various embodiments herein can enable a computer-implemented process for programmatic assertion of a standard condition search, wherein a search standard condition module can receive, in an extraction phase, a user document from a preparation process comprising object character recognition (OCR) and tokenization. In response to receiving the user document, the search standard condition module can use a probabilistic relevance weighting model having sentence ranking and retrieval function capabilities, wherein the probabilistic relevance weighting model can be configured to retrieve relevant sentences from the user document, using information from a predetermined dictionary of query sentences, according to inverse document frequency (IDF). The probabilistic relevance weighting model can use a distribution of index words of sentences retrieved from the user document and normalization to retrieve the relevant sentences from the user document. Retrieving the relevant sentences can comprise computing a normalized relevance score for a sentence from the user document by considering a weight of relevance of a word from a respective sentence (e.g., a query sentence) in the dictionary of query sentences, wherein an increase in frequency of the word can cause the word to become less relevant. The normalized relevance score can be computed within a range of 0 to 1, and in response to mining similar sentences from the user document and the dictionary of query sentences, the search standard condition module can define a relevance score threshold. More specifically, the relevance score threshold can be defined by mining similar sentences from the user document and the dictionary of query sentences, annotating one or more pairs of relevant sentences and measuring a fall-out metric. The fall-out metric can be computed as a proportion of non-relevant documents retrieved, out of all non-relevant documents available.

The search standard condition module can further execute a resolution phase, wherein, in response to receiving as input all pairs of sentences with respective normalized relevance scores above the relevance score threshold, a POS tagging module, with capability of tagging parts of speech in each sentence, can make assertions based on a number of POS tag words (such as, for example, verbs, adverbs and adjectives) in each sentence. During the resolution phase, an entity relationship module can analyze each sentence to perform named entity recognition and compute noun chunking. In response to the analyzing, a verb polarity module can identify verb polarities to assert for a change in polarities of verbs in the sentences, and an antonym/synonym knowledge base logic comparison module can use a predetermined dictionary of antonyms and synonyms to identify an intention change in sentences, for example, when two sentences in a pair of sentences have the same number of verbs, adverbs, and adjectives. Thereafter, the search standard condition module can implement a set of NLP rules to determine a result encoded in an array of Booleans indicating "true" when a sentence from the user document can be identified as having the same meaning as the query sentence, and "false" when the sentence from the user document can be identified as not having the same meaning as the query sentence. An NLP parser can assert for the results based on equal amounts of target POS tag words (e.g., verbs, adjective, adverbs), a change in polarity of verbs, adverbs and adjectives, and a change in meaning of a sentence due to a direct change in a word to its antonym. The search standard condition module can indicate a result as being one of a partial match between sentences (e.g., between a query sentence and a sentence from a contract being analyzed) to assert that two sentences can have the same meaning despite the two sentences not being an exact match, not being a match, and being an exact match.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, system 100 can be associated with, such as accessible via, a computing environment 1000 described below with reference to FIG. 10, such that aspects of processing can be distributed between system 100 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can automatically assert whether standard conditions are present in a document by using similarity and NLP in accordance with one or more embodiments described herein.

The system 100 and/or the components of the system 100 can be employed to use hardware and/or software to solve problems that are highly technical in nature (e.g., related to automatic assertion of standard conditions in a document by using similarity and NLP parsers), that are not abstract and that cannot be performed as a set of mental acts by a human. Further, some of the processes performed may be performed by specialized computers for carrying out defined tasks related to machine learning, automatic assertion of standard conditions in a document by using similarity and NLP parsers and so on. The system 100 and/or components of the system can be employed to solve new problems that arise through advancements in technologies mentioned above and/or the like. The system 100 can provide technical improvements to machine learning systems by providing a machine learning model with accuracy above a defined threshold. For example, system 100 can provide a machine learning model with higher accuracy (e.g., than other models) due to challenges associated with machine learning models in terms of distinguishing nuances of language, specifically due to presence of negation generated by polarities and/or verb synonym conversions when similar sentences have different meanings. Accuracy in the context of the embodiments of the present disclosure can be a ratio of a number of correct classifications (e.g., sentences extracted having a correct meaning/desired meaning) divided by a total number of predictions, as given below.

Ac=(TP+TN)/(TP+TN+FP+FN), wherein Ac can represent accuracy, TP can represent a number of true positives, TN can represent a number of true negatives, FP can represent a number of false positives, and FN can represent a number of false negatives. For exemplary purposes, assume a query sentence represented by Q and a document represented by D having 10 sentences wherein 3 of the sentences have the same meaning as that of Q. Suppose that after running system 100 (e.g., utilizing system 100 to process the document) 4 sentences can be retrieved, wherein 2 of the sentences can have the same meaning as that of Q and 2 of them can have a different meaning. Then, TP=2 (two correctly extracted sentences), TN=5 (sentences not correctly extracted), FN=1 (one sentence having the same meaning as that of Q but not extracted), FP=2 (two sentences have different meaning but was extracted) and AC=(2+5)/(2+5+2+1)=0.7==>70% accuracy.

The machine learning model, backed by a resolution phase/resolution module as described elsewhere herein, can perform automated labeling for automatic assertion of presence of standard clause conditions in a document. For example, the machine learning model can perform automatic assertion of presence of standard terms in a contract document involving payment terms, wherein the contract document can be standard, but payment terms can vary. The machine learning model can operate without utilizing a large amount of resources. Contracts can be input into system 100 and the contracts can be interrogated, for example, for presence of standard payment terms. If non-standard terms can be identified in a contract, human entities can perform additional work on the non-standard terms. In one or more embodiments, the contract document can be a legal contract, a business contract, etc.

Discussion turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 (e.g., extraction module 108, resolution module 110, preparation engine 112, POS tag module 114, entity relationship module 116, verb polarity module 118 and/or logic comparison module 120) to perform one or more actions. In one or more embodiments, memory 104 can store computer-executable components (e.g., extraction module 108, resolution module 110, preparation engine 112, POS tag module 114, entity relationship module 116, verb polarity module 118 and/or logic comparison module 120).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). For example, extraction module 108 can retrieve a first sentence from a document based on similarity of the first sentence to a second sentence from dictionary of query sentences 124, and further analysis can be performed on the first sentence and the second sentence by one or more components of system 100 to automatically identify whether the first sentence and the second sentence are semantically similar to one another. The document can be a user document, a legal contract, a business document (e.g., a request for proposal (RFP), another business document, etc.), a corpus of contracts, and so on.

In one or more embodiments, a system or entity within an organization can aim to identify whether standard clauses or a set of standard clauses are present in the document, wherein the standard clauses can be a single sentence (e.g., "The fixed price for this project is based on a contiguous work schedule.") or multiple sentences. For example, prior to executing a legal contract, a legal department in an organization can generate various types of clauses or words to be used within the legal contract. For example, the legal department can generate a template comprising phrases with specific verbiage that can identify payment terms, limitation of liability clauses, termination clauses, etc., wherein the template can be dictionary of query sentences 124. However, in practice, language used in the legal contract to define the payment terms, the limitation of liability clauses, the termination clauses, etc. can be different that standard verbiage specified by the legal department in the template. Thus, after execution of the legal contract, the verbiage from the legal contract can be compared against standard language defined by the legal department such that presence of desired verbiage in the legal contract can be automatically ensured.

In one or more embodiments, a system or entity can aim to identify whether a specific sentence or a list of sentences is available in the document. For example, a contract can comprise a list of sentences, wherein respective sentences can be compared to one or more sentences from dictionary of query sentences 124 to automatically identify whether the respective sentences are semantically similar to the one or more sentences from dictionary of query sentences 124. As such, dictionary of query sentences 124 can be a database that can be specific to a use case such as, for example, payment terms, legal contracts, business documents, etc., wherein dictionary of query sentences 124 can be created by a subject matter expert.

Determining presence of standard clauses and standard conditions in the document can be preceded by a preprocessing stage, wherein preparation engine 112 can perform text extraction on the document via techniques known in the art, such as OCR and/or tokenization, to break down the document into individual sentences. Thereafter, extraction can be performed on the document, by extraction module 108, based on a similarity code, followed by resolution, by resolution module 110, on pairs of similar sentences using NLP rules backed by linguistic dictionary 126. Linguistic dictionary 126 can be a dictionary of synonyms and antonyms. More specifically, preparation engine 112 can perform OCR and tokenization on the document, and the document can be processed by extraction module 108 and resolution module 110 after the OCR and the tokenization.

OCR and tokenization can refer to digitization of documents. For example, the document or a contract can be an image (e.g., a portable document format (PDF) document, a scan of a document, a scan of a signed legal document, etc.) that can be digitized for further processing, or the document or contract can be an original document (e.g., a Microsoft Word document, etc.). OCR can be performed when the document is an image, wherein OCR can take the image of the document and convert the image into text to digitize the document. Thereafter, the digitized document can be run through a tokenization engine (or tokenizer), that can split the document into tokens. For example, a document can be tokenized before applying a machine learning model on the document. Tokenization can be performed via various publicly available libraries. On the contrary, the document can be directly processed by the tokenization engine (e.g., without OCR) in case of the document being an original document (e.g., a Microsoft Word document, etc.). Thus, based on a document being stored as an image (e.g., a scanned copy, a PDF document, etc.) or as an original file (e.g., a Microsoft Word document, etc.) preparation engine 112 can perform OCR and/or tokenization to prepare the document for the extraction phase and the resolution phase.

After tokenization, the document can be split into an array of sentences. That is, upon tokenization, the document can be divided into individual sentences and a similarity code can be used to compute similarity between standard clauses in the document (e.g., the tokenized document) and dictionary of query sentences 124, wherein the similarity of each standard clause in dictionary of query sentences 124 can be measured against every sentence in the array of tokenized sentences that can be an output of the tokenization engine.

Extraction module 108 can leverage a normalized relevance score to identify pairs of sentences based on relevance and similarity. For example, extraction module 108 can use a probabilistic relevance weighting model to retrieve a first sentence from the document by computing a normalized relevance score of the first sentence based on a relevance weighting score of a second sentence from dictionary of query sentences 124. For example, extraction module 108 can use a probabilistic relevance weighting model to retrieve the first sentence from the document by computing a normalized relevance score of the first sentence based on weighting relevance of a word in the second sentence from dictionary of query sentences 124. The normalized relevance score can enable extraction module 108 to retrieve the first sentence based on both, relevance, and similarity, thereby increasing recall. Recall can be a metric that can measure whether a model (e.g., a machine learning model) can retrieve relevant items specific to a use case. For example, in case of retrieving standard terms from a document or identifying standard conditions in a document, it can be useful to retrieve candidate items based on similarity as well as relevance, for example, as opposed to losing relevant terms (e.g., false negatives), wherein recall can be smaller. Recall can also be defined as a true positive rate over a false positive rate and a false negative rate.

In the various embodiments discussed herein, given a standard term, a majority of terms relevant to the standard term that can be retrieved by a model, can be related by the recall. For example, out of 100 documents, each comprising a target sentence, if 80 documents can be correctly retrieved, then the recall can be 80. Thus, higher the recall, more the relevant items can be retrieved. The normalized relevance score when applied to sentence matching can become more sensitive to appearance of same words in the first sentence and the second sentence. The normalized relevance score can be empirically higher than a cosine similarity when computing the normalized relevance score between relevant sentences. Thus, setting a relevance score threshold (e.g., >0.7) based on the normalized relevance score can retrieve more candidates, for examples, as compared to cosine similarity.

Retrieving the first sentence from the document (e.g., by extraction module 108) can comprise IDF, and the probabilistic relevance weighting model can be a sentence ranking and retrieval function that can consider a distribution of index words of a sentence for retrieving the first sentence. The probabilistic relevance weighting model can be an alternative probabilistic weighting model based on the Okapi BM25 (wherein BM stands for "best matching") model that can avoid a need to create expensive training, testing and validation data sets and that can be more suitable for dictionary-based information retrieval (IR) applications. Moreover, the probabilistic relevance weighting model can overcome a drawback of lack of normalization in the Okapi BM25 model by generating the normalized relevance score. The normalized relevance score can be a relevance score normalized from 0 to 1 instead of a rank that can range from 0 to infinity. As such, the normalized relevance score can allow for the relevance score threshold to be set in the range of 0 to 1. As stated earlier, the probabilistic relevance weighting model can be a sentence ranking and retrieval function that can consider a distribution of index words of sentences. In various embodiments described herein, the sentence ranking and retrieval function can be based on a bag-of-words for retrieving relevant sentences based on dictionary of query sentences 124. The sentence ranking and retrieval function can depend on IDF to consider a weight of relevance of a word w of the second sentence, wherein a greater frequency of occurrence of the word w in a sentence can imply that the word w is less relevant. Additional aspects of IDF and the normalized relevance score have been described in greater detail with respect to FIG. 2.

After the extraction phase, a resolution phase can be executed (e.g., by system 100, a machine learning model), wherein resolution module 110 can use a set of NLP rules and linguistic dictionary 126 to automatically identify whether the first sentence and the second sentence have the same meaning based on the normalized relevance score being above a defined threshold (e.g., a relevance score threshold). The relevance score threshold can be defined by mining similar sentences from the document and dictionary of query sentences 124, annotating one or more pairs of relevant sentences and measuring a fall-out metric defined as a proportion of non-relevant documents retrieved out of non-relevant documents available. The resolution phase can receive as input, all pairs of sentences (e.g., (Q,S)) having a normalized relevance score above the relevance score threshold, and assertions can be performed based on grammar, verbs, predicative text, etc., for extracting a standard clause from a document. For example, during the resolution phase, system 100 can assert whether sentences have the same meaning, based on the set of NLP rules implemented in system 100. A workflow of assertion performed during the resolution phase has been described in greater detail with respect to FIG. 4.

Figure 5:
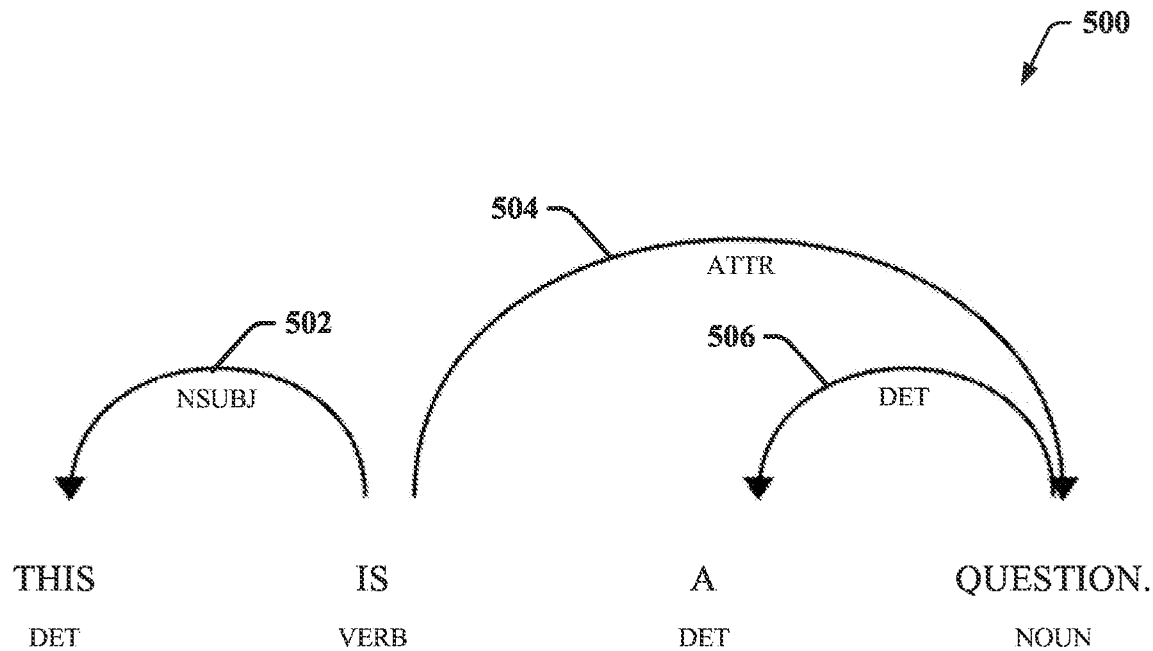
FIG. 5 illustrates an example, non-limiting graph showing part-of speech (POS) tagging and entity relationship analysis of tokens in accordance with one or more embodiments described herein.

During the resolution phase, the pairs of sentences having a normalized relevance score above the relevance score threshold can be processed by POS tag module 114, wherein POS tag module can tag parts of speech in the pairs of sentences and assert for a number of actions based on a number of verbs in the pairs of sentences. For example, POS tag module 114 can receive an array with pairs of relevant sentences (Q, S) from the extraction phase and perform POS tagging, wherein POS tag module 114 can assert for a number of actions due to a number of verbs comprised in each sentence, wherein semantically similar sentences can respectively have the same number of verbs. For example, the first sentence and the second sentence can form a pair of relevant sentences, and POS tag module 114 can tag parts of speech in the first sentence and the second sentence and assert for actions based on a number of verbs in the first sentence and the second sentence. POS tag module 114 can count an amount of verbs in pairs of similar sentences, such as in the first sentence and the second sentence, and tag words in the first sentence and the second sentence as verbs, adverbs, etc. Further, entity relationship module 116 can perform named entity recognition and noun chunking on the first sentence and the second sentence. Entity relationship module 116 can also perform relationship analysis on words comprised in the first sentence and the second sentence to highlight relationships between words. For example, with reference to FIG. 5, the labels "VERB," "DET," and "NOUN" can be POS tags for words in a sentence, whereas the arched arrows can indicate dependence between the words. In FIG. 5, "DET" can indicate a determiner. Receiving the query sentence, POS tagging and entity relationship analysis can comprise techniques known in the art for NLP solutions.

Verb polarity module 118 can detect verb polarities in the first sentence and the second sentence to assert for changes in the verb polarities. Verb polarity module 118 can used a sentence parser to identify verb polarities. For example, sentence 1 (e.g., first sentence) and sentence 2 (e.g., second sentence) mentioned below can be exemplary sentences, and sentence 1 and sentence 2 can respectively belong to the contract being analyzed for presence of standard conditions and dictionary of query sentences 124. The verb "provide" can be considered as having a positive polarity in sentence 1 and a negative polarity in sentence 2, since "provide" is preceded by the word "not" in sentence 2. Verb polarity module 118 can identify the difference in the polarity of the verb "provide" in sentence 1 and sentence 2 to identify a difference in nature of both sentences, for example, from obligation to exclusion.

Sentence 1: Company will provide access to services and system.

Sentence 2: Company will not provide access to services and system.

Verb polarity module 118 can use an NLP library for assertion to identify whether a polarity of the verb is an assertion or negation. Checking polarity of verbs can assist with detection of sentences that can be similar in meaning. For example, a machine learning model applied to sentence 1 and sentence 2 without a verb polarity check can mark both sentences as highly similar (e.g., 95% similar) despite the word "provide" having a different polarity in each sentence. However, a polarity change of a verb can change a meaning of a sentence, such as can be evident from sentence 1 and sentence 2. Thus, verb polarity module 118 can prevent semantically dissimilar sentences from being classified as having the same meaning, thereby assisting with identification of standard conditions in a document. As such, the proposed architecture of various embodiments of the present disclosure can be unresponsive to changes in meaning of sentences due to negations.

Logic comparison module 120 can use linguistic dictionary 126 to identify intention changes in the first sentence and the second sentence when the first sentence and the second sentence respectively comprise equal amounts of verbs, adverbs, and adjectives. Linguistic dictionary 126 can be a dictionary of synonyms and antonyms, such as WordNet. Sentences can have different meanings either due to changes in polarities of verbs as discussed above, or due to words changing from synonyms to antonyms. For example, considering sentence 1 (e.g., first sentence) and sentence 3 (second sentence), the words "provide" and "deny" can be considered as having a positive polarity. Furthermore, sentence 1 and sentence 3 can respectively comprise equal amounts of verbs and adverbs. However, since "deny" can be an antonym of "provide" given the context of the two sentences, sentence 3 can be considered semantically dissimilar to sentence 1 due to the verb "provide" changing from a synonym to an antonym. Thus, logic comparison module 120 can also prevent semantically dissimilar sentences from being classified as having the same meaning, thereby assisting with identification of standard conditions in a document.

Sentence 3: Company will deny access to services and system.

Figure 7:
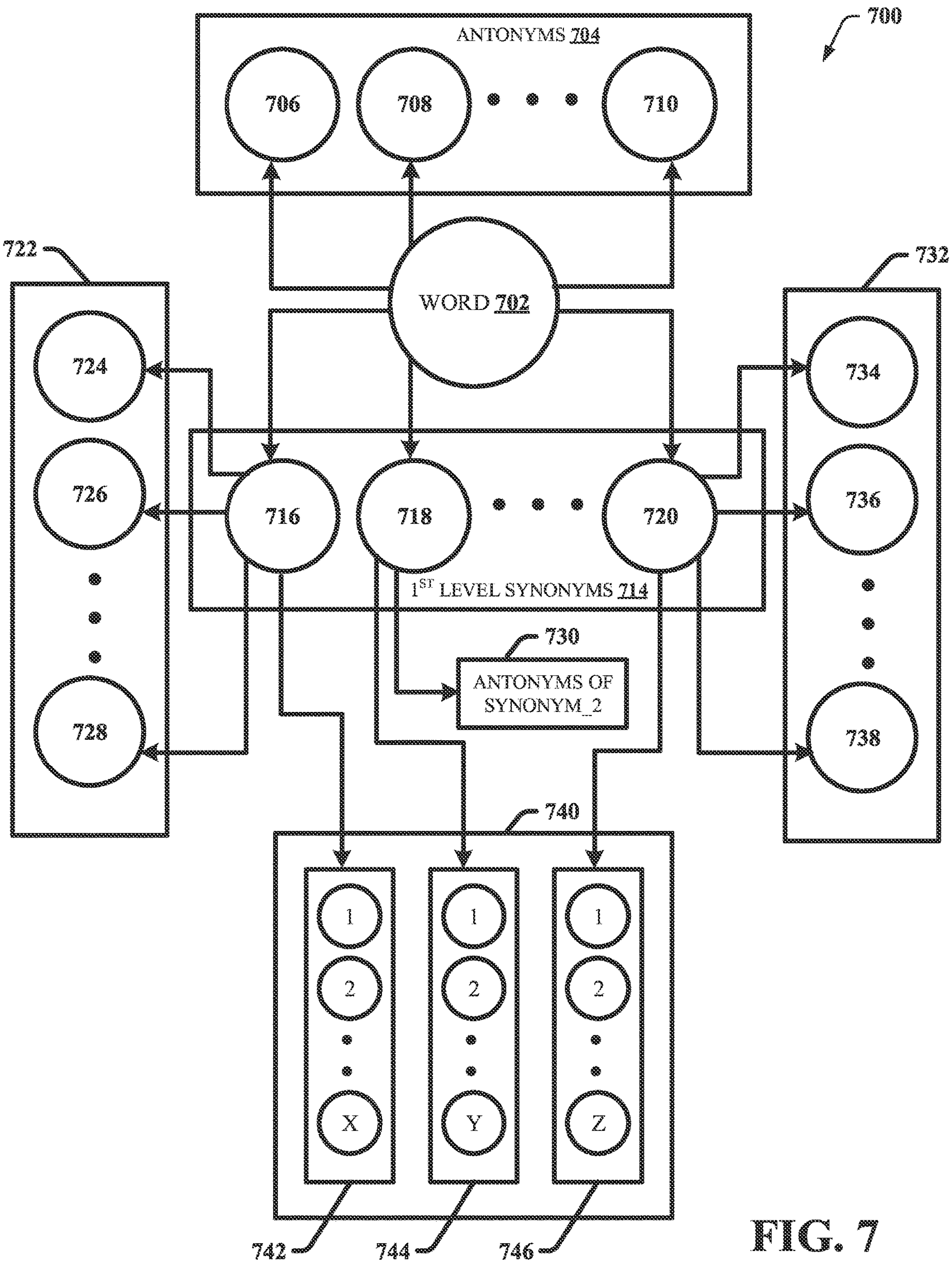
FIG. 7 illustrates an example, non-limiting representation of a synonym/antonym space that can be leveraged to identify an intention change between sentences in accordance with one or more embodiments described herein.

Identifying intention changes based on synonym and antonym changes can be based on the concept of Synset (synonym set). A word can have synonyms and antonyms, however a change in a word can be direct or indirect since each synonym of a word can have synonyms and antonyms. For example, a word can have N numbers of synonyms and M numbers of antonyms, and each of the N synonyms can have another set of synonyms. FIG. 7 can illustrate an exemplary net of synonyms and antonyms of a word. As such, a verb in the first sentence can be a direct or indirect synonym or antonym of a verb in the second sentence, and the first sentence can have a different meaning that the second sentence. Logic comparison module 120 can scan the first sentence and the second sentence to assert whether a change in meaning between the two sentences can be attributed to a synonym-to-synonym-to-synonym change or to a synonym-to-antonym change.

NLP parser 122 can use the set of NLP rules to generate a result encoded in an array of Booleans that can indicate whether a first condition in the first sentence matches a second condition in the second sentence. A determination of whether the first condition matches the second condition can be based on conditions selected from a group comprising an amount of target POS words, an intention change due to change in polarity of words, and an intention change due to a change from synonyms to antonyms. For example, NLP parser 122 can assert for results of prior modules (e.g., POS tag module 114, entity relationship module 116, verb polarity module 118, logic comparison module 120) based on equal amount of target POS tag words (e.g., verbs, adjective, adverbs), change in polarity of verbs, adverbs and adjectives and change in meaning of a sentence due to a word changing from a synonym to an antonym of the word. The NLP rules can be embedded by a Python module code.

An output of the resolution phase can be an array of Booleans indicating "true," if a standard condition represented by the first sentence matches a standard condition represented by the second sentence, and "false," if the standard condition represented by the first sentence does not match the standard condition represented by the second sentence. One or more embodiments discussed herein can be expanded to a variety of solutions, wherein a relevant term can be identified by a relevance score and the resolution phase can indicate that the relevant term has more obligations, for example, due to presence of more verbs. Thus, the resolution phase can also be used to indicate whether the standard condition represented by the first sentence can be a partial match to the standard condition represented by the second sentence. In one or more embodiments, system 100 can be used to assert whether two sentences have the same meaning, despite the two sentences not being an exact match.

Figure 2:
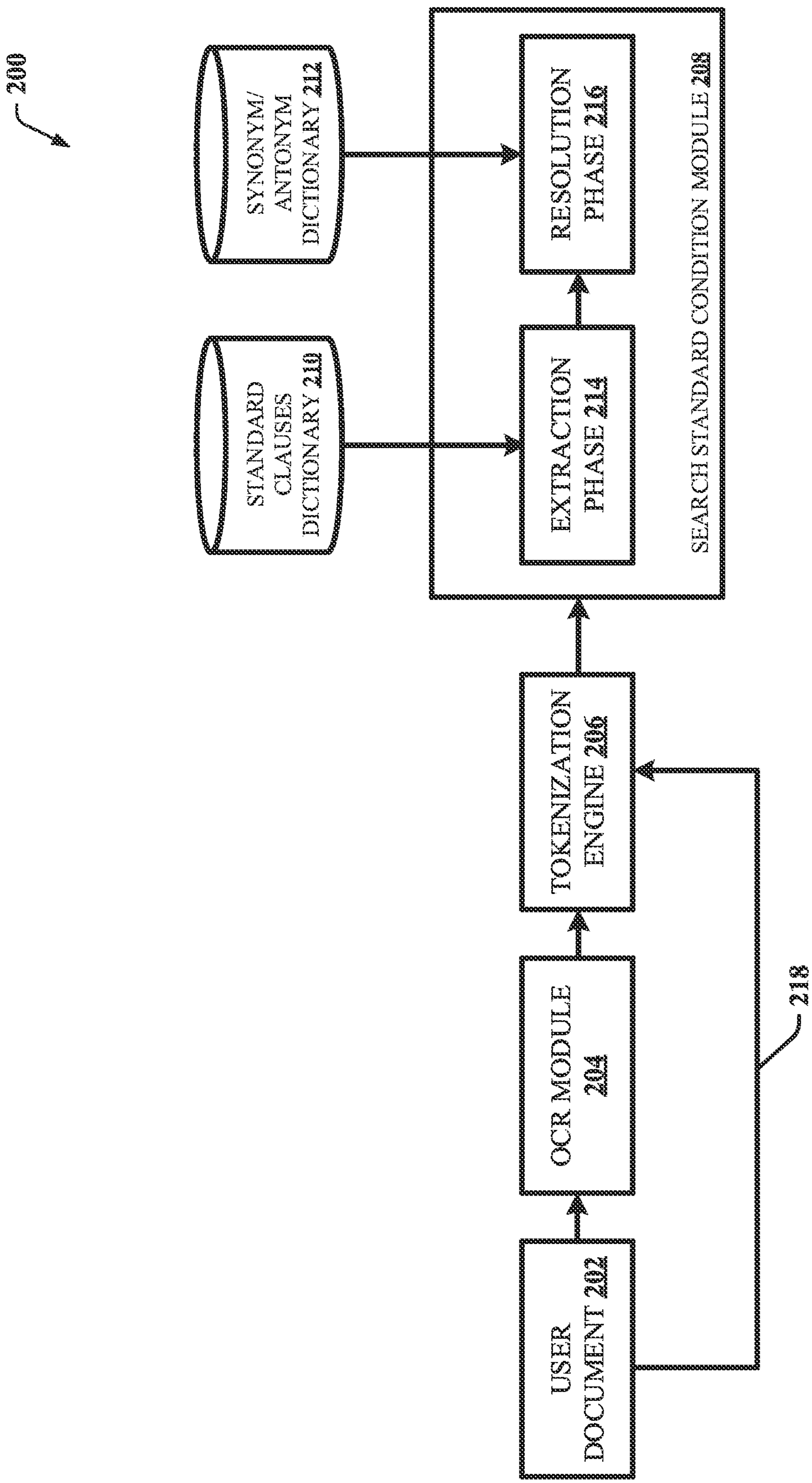
FIG. 2 illustrates a flow diagram of an example, non-limiting workflow that can automatically assert whether standard conditions are present in a document by using similarity and NLP in accordance with one or more embodiments described herein.

FIG. 2 illustrates a flow diagram of an example, non-limiting workflow 200 that can automatically assert whether standard conditions are present in a document by using similarity and NLP in accordance with one or more embodiments described herein. One or more embodiments described with respect to FIG. 2 can be implemented by one or more components of system 100 illustrated in FIG. 1. Repetitive description of like elements and/or processes employed in respective embodiments is omitted for sake of brevity.

Various embodiments herein can provide a search engine that can automatically confirm existence of predefined sentences in user document 202. User document 202 can be a physical document, an image (e.g., a scan, a PDF, etc.) of a digital file such as a Microsoft Word file, etc. Further, user document 202 can be a legal contract, a business document (e.g., an RFP, another business document, etc.), a corpus of contracts, and so on, and an entity within an organization can aim to identify whether standard clauses or a set of standard clauses are present in user document 202, wherein the standard clauses can be a single sentence or multiple sentences. For example, in the legal domain, reviewers of legal contracts can desire to confirm whether mandatory clauses representing standard conditions exist in a legal contract.

In one or more embodiments, user document 202 can be processed via OCR module 204 and tokenization engine 206, wherein user document 202 can be broken down into individual sentences. OCR module 204 can perform OCR on user document 202 and tokenization engine 206 can perform tokenization on user document 202. OCR and tokenization can digitize user document 202. For example, user document 202 can be an image (e.g., a PDF document, a scan of a document, a scan of a signed legal document, etc.) that can be digitized for further processing, or user document 202 can be an original document (e.g., a Microsoft Word document, etc.). OCR can be performed when user document 202 is an image, wherein OCR can take the image of user document 202 and convert the image into text to digitize user document 202. Thereafter, user document 202 (e.g., the digitized document) can be run through tokenization engine 206, wherein tokenization engine 206 can split user document 202 into tokens. Tokenization can be performed via various publicly available libraries. On the contrary, user document 202 can be directly processed by tokenization engine 206 (e.g., without OCR, as indicated at 218) in case of user document 202 being an original document (e.g., a Microsoft Word document, etc.). Thus, based on user document 202 being an image (e.g., a scanned copy, a PDF document, etc.) or an original file (e.g., a Microsoft Word document, etc.) OCR and/or tokenization can be performed on user document 202. Tokenization can split user document 202 into an array of tokenized sentences.

Upon tokenization, user document 202 can be divided into individual sentences and a similarity code can be used to compute similarity between standard clauses in user document 202 and standard clauses dictionary 210 (e.g., dictionary of query sentences 124), wherein the similarity of each standard clause in standard clauses dictionary 210 can be measured against every sentence in the array of tokenized sentences that can be an output of tokenization engine 206. Thereafter, search standard condition module 208 can perform extraction on user document 202, based on a similarity code, followed by resolution on pairs of similar sentences using NLP rules backed by synonym/antonym dictionary 212 (e.g., linguistic dictionary 126). Standard clauses dictionary 210 can be a database that can be specific to a use case such as, for example, payment terms, legal contracts, etc., wherein standard clauses dictionary 210 can be created by a subject matter expert at an organization. Synonym/antonym dictionary 212 can be a dictionary of synonyms and antonyms.

More specifically, after tokenization, search standard condition module 208 can execute extraction phase 214, wherein a normalized relevance score can be leveraged (e.g., by extraction module 108) to identify pairs of sentences based on relevance and similarity. For example, search extraction module 108 can use a probabilistic relevance weighting model to retrieve a first sentence from user document 202 by computing the normalized relevance score for the first sentence based on weighting relevance of a word in a second sentence from dictionary of query sentences 124. The normalized relevance score can enable extraction module 108 to retrieve the first sentence based on both, relevance, and similarity, thereby increasing recall. As stated elsewhere herein, recall can be a metric that can measure whether a model (e.g., a machine learning model) can retrieve relevant items specific to a use case. For example, in case of retrieving standard terms from user document 202 or identifying standard conditions in user document 202, it can be useful to retrieve candidate items based on similarity as well as relevance, for example, as opposed to losing relevant terms (e.g., false negatives), wherein recall can be smaller. Recall can also be defined as a true positive rate over a false positive rate and a false negative rate. In the various embodiments discussed herein, given a standard term, a majority of terms relevant to the standard term that can be retrieved by a model, can be related by the recall. Thus, higher the recall, more the relevant items can be retrieved.

As such, extraction phase 214 can be directed towards improving recalls or towards generating a normalized relevance score that can identify a majority of relevant terms in user document 202 without relying only on similarity. Retrieving the first sentence from user document 202 (e.g., by extraction module 108) can comprise IDF, and the probabilistic relevance weighting model can be a sentence ranking and retrieval function that can consider a distribution of index words of the first sentence for retrieving the first sentence. Moreover, the normalized relevance score generated by the probabilistic relevance weighting model can be a relevance score normalized from 0 to 1 instead of a rank that can range from 0 to infinity. As such, the normalized relevance score can allow for the relevance score threshold to be set in the range of 0 to 1. As stated earlier, the probabilistic relevance weighting model can be a sentence ranking and retrieval function that can consider a distribution of index words of sentences. In various embodiments described herein, the sentence ranking and retrieval function can be based on a bag-of-words model for retrieving relevant sentences based on dictionary of query sentences 124. The sentence ranking and retrieval function can depend on IDF (Idf(w)), as defined in equation 1, to consider a weight of relevance of a word w of the second sentence, wherein a greater frequency of occurrence of the word w in a sentence can imply that the word w is less relevant.

As described above, the probabilistic weighting model can compute the normalized relevance score for relevant sentences, instead of simply retrieving relevant documents (such as performed by the Okapi BM25 model). Thus, index terms from sentences can become index words. The steps employed in normalizing a relevance score can be described by equation 1. IDF can depend on an amount of sentences in the document (e.g., $N_s$) and frequency of an amount of the word w in the document. The word w can represent an actual word. For example, the word "customer" can have several occurrences in user document 202, and, therefore, a weight of the word "customer" can be relatively less that a weight of the word "payment." That is, the word "customer" can be considered less relevant. This can be further described by the code below that can be an output of equation 1. As stated elsewhere herein, equation 1 can generate a weight for each word, and Idf(w) can represent the weight of a word (w). Thus, the array presented below can be the same data as Idf("payment")=0.7 and Idf("customer")=0.2.

```
[{"word": "payment",
"weight": 0.7},
{"word": "customer",
"weight": 0.2}]
```

$$Idf(w) = 1 + \log_e\left(\frac{1+N_s}{1+df(w)}\right), \qquad \text{Equation 1}$$

wherein $N_S$ can be the total number of sentences in a user document (e.g., total number of sentences of user document 202 that can be tokenized), and df(w) can be the frequency of the number of sentences in user document 202 where the word w can be present. It is to be appreciated that equation 1 uses a natural logarithm.

Considering a query sentence Q, such that $Q=(q_1, \ldots, q_m)$, wherein Q can comprise m words, and a sentence S from a user document, such that $S=(w_1, \ldots, w_m)$, wherein S can comprise n words, the normalized relevance score can be formally defined by equation 2.

$$\text{score}(S, Q) = \sum_{i=1}^{n} Idf(w_i) \cdot \frac{dfs(w_i) \cdot (k_1 + 1)}{dfs(w_i) + k_1 \cdot \left(1 - b + b \cdot \frac{N_w}{\langle N_w \rangle}\right)} \cdot \frac{1}{\text{MAX(score)}}, \quad \text{Equation 2}$$

wherein score (S, Q) can be the normalized relevance score of sentence S from the user document given the query sentence Q, frequency function $dfs(w_i)$ can represent the frequency of the word $w_i$ in sentence S, $N_w$ can be the total number of words in sentence S and $\langle N_w \rangle$ can represent the average number of words in all sentences S and Q. The parameter $k_1$ can vary between 1.2 and 2.0, and $k_1$ and b can be free parameters that can be adjusted by a user or system administrator to improve a normalized relevance score, for example, if a normalized relevance score cannot retrieve relevant items. The parameter $k_1$ can be considered a hyper-parameter that can be adjusted based on empirical results. It can be observed from equation 2 that higher the $k_1$ value, less dependent the overall score can be on a size of the user document and a frequency of the word w $$\left(\text{i.e., } \frac{N_w}{\langle N_w \rangle}\right)$$

in the summation of equation 2. In various embodiments discussed herein, $k_1=1.5$ and $b=0.75$. The term $$\frac{1}{\text{MAX(score)}}$$

can be a normalization factor wherein MAX(score) can indicate a maximum relevance score of the query sentence Q. This can be equivalent to computing a score (Q, Q) based on query sentence Q (self-similarity), considering the bag-of-words computed from all sentences and depending on a particular user document based on which the model can perform computations.

The left portion of equation 2 (i.e., not including the $$\frac{1}{\text{MAX(score)}}$$

term) can represent a summation of IDF over a word i, and the summation can be over all the words in a document (e.g., user document). Thus, in the process described herein, a weight of each word (e.g., IDF of a word i) can be computed, resulting in a database of weights, and a weighted average can be taken into consideration. Individual words can have individual weights, for example, a word "user" can have a weight of 0.3, a word "file" can have a weight of 0.2, etc. The IDF can be computed for various types of words including verbs, nouns, etc., however, a pre-processing step to remove words that can be less relevant (e.g., words such as "to," etc.) can be performed. The remaining tokens can have a dictionary of weights generated by equation 1, representing relevance of a word to a topic of discussion. For example, for a topic of discussion surrounding oceans, the word "whale" can become more relevant than the word "computer." Respective weights of individual words can be strictly defined by equation 1 based on a concept that the more frequent a word is, the less relevant it can be. However, unique words, for example, such as words appearing only once or twice in a document, can also be irrelevant to the document. Thus, based on a defined level of frequency of occurrence of words, a word can become more relevant for IDF.

The term $$\frac{1}{\text{MAX(score)}}$$

can normalize the relevance score to generate the normalized relevance score. An unnormalized relevance score can present challenges in terms of defining the relevance score threshold for information retrieval. For example, an unnormalized relevance score of a standard term can be 73, which can be an integer or a floating point, however, the term $$\frac{1}{\text{MAX(score)}}$$

can generate a normalization from 0 to 1. An algorithm to normalize the relevance score can be defined by algorithm 1. In an embodiment, the normalized relevance score can be interpreted (e.g., by an entity, a human entity) as a percentage of relevance between sentences (e.g., between the first sentence and the second sentence). For example, the first sentence and the second sentence can be interpreted as being 60% relevant based on a normalized relevance score for the two sentences, which can be challenging to do, for example, in case of an unnormalized relevance score of 49.

Assuming a standard term (e.g., a query sentence) in standard clauses dictionary 210, user document 202 can have several sentences (e.g., sentence A, sentence B, sentences C, etc.). Algorithm 1 can first measure similarity between the standard term and each of sentence A, sentence B, sentences C, etc., resulting in an unnormalized relevance score (e.g., 10 for sentence A, 7 for sentence B, 15 for sentence C, etc.). That is, an unnormalized relevance score between each sentence from user document 202 and the standard term can be generated. To normalize the respective unnormalized relevance scores, the standard term can be included in the list of sentences in the user document 202, wherein an unnormalized relevance score of the standard term (e.g., 80) can be the maximum unnormalized relevance score, and the respective unnormalized relevance scores of the each sentence (e.g., 10, 7, 15, etc.) from user document 202 and the standard term (e.g., 80) can be divided by the unnormalized relevance score of the standard term (e.g., 80). Algorithm 1 can be a pseudo-algorithm that can be implemented for normalizing a relevance score to generate the normalized relevance score.

Algorithm 1:

```
query__norm = normalize([query__sentence])
corpus__norm = normalize(corpus)
corpus__norm = query__norm + corpus__norm
top__similar__sentences = bm25__score(query__norm, corpus__norm)
max__score = top__similar__sentences[0]
top__similar__sentences = top__similar__sentences[1:]
   bm25__normalized__scores = [i[1]/max__score[1] for i
   in top__similar__sentences]
```

In algorithm 1, "corpus" can represent the list of sentences of the user document (tokenized by tokenization engine 206), "query_sentence (str)" can represent the sentence to be identified in the corpus array, and "normalize (method)" can represent receiving an array of "str" and returning an array of "str," wherein "str" can be the data type (string) and "corpus (array of str)" can represent a list of sentences (or array of sentences), and wherein the method can precede sentence normalization steps that can include removal of stop-words and lemmatization. Further the normalization can be computed at line 3 in algorithm 1, wherein the standard term can be added to the corpus of sentences from user document 202, and the unnormalized relevance score can be divided by the maximum score (i.e., the unnormalized relevance score of the standard term) at line 6.

Prior to computing similarity between sentences, the query term can be added into a corpus containing the sentences from user document 202 generated by tokenization engine 206 (e.g., a sentence tokenization module), and the query term can have highest similarity to itself, which can be represented by the term MAX(score). The process can be performed after tokenization. In other words, the term $$\frac{1}{\text{MAX(score)}}$$

in equation 2 can be generated by computing (e.g., by extraction module 108) a self-relevance score that can be the MAX(score), which can be further generated by computing the system can fall back to search for variations having the same meaning as the standard term. For example, a standard term can have standard term variation 0, standard term variation 1, standard term 2). As such, upon identifying any variation of the standard term, the system can assert (e.g., during resolution phase 216) "true," indicating presence of a standard condition in user document 202.

Algorithm 2 describes a Python version implementation of various embodiments discussed herein to compute BM25 score. That is, algorithm 2 can be used by algorithm 1 and describes a process to compute an BM25 score (unnormalized version). In algorithm 2, the method named "bm25_score" (used by algorithm 1) can receive as a parameter, a query sentence normalized array (i.e., query_norm) and the corpus of sentences normalized (i.e., corpus_norm) and compute a relevance score as defined in equation 2, but without the normalization factor. The method can return a list of tuples, wherein a first tuple index can represent an index of sentences similar to a query sentence, while a second tuple index can be the relevance score (unnormalized). In algorithm 2, CountVectorizer (class) can be a class to perform bag-of-words count vectorization according to equation 1, np (library) can be NumPy library imported as "import numpy as np," and compute_corpus_term_idfs (method) can receive the feature matrix extracted by the CountVectorizer object and the normalized sentences from the user document and return the IDF weight of the words of the user document according to equation 1. Algorithm 2 can be an unnormalized version implementation of algorithm 1.

Algorithm 2:

```
def bm25_score(query_norm, corpus_norm):
vectorizer = CountVectorizer(binary=False, min_df=0, max_df=1,
ngram_range=(1,1))
vectorizer.fit(corpus_norm)
corpus_features = vectorizer.transform(corpus_norm)
doc_lengths = [len(doc.split( )) for doc in corpus_norm]
avg_dl = average(doc_lengths)
corpus_term_idfs = compute_corpus_term_idfs(corpus_features, corpus_norm)
query_features = vectorizer.transform(query_norm)
query_feature = query_features[0]
corpus_features = corpus_features.toarray( )
query_features = query_features.toarray( )[0]
query_features[query_features >= 1] = 1
doc_idfs = query_features * corpus_term_idfs
numerator_coeffient = corpus_features * (k1 +1)
numerator = np.multiply(doc_idfs, numerator_coeff)
denominator_coeffient = k1 * (1 − b + (b * (corpus_doc_lengths /
avg_doc_length)))
denominator_coefficient = np.vstack(denominator_coefficient)
denominator = corpus_features + denominator_coefficient
bm25_scores = np.sum(np.divide(numerator, denominator), axis=1)
top_sentences = bm25_scores.argsort( )[::−1]
top_sentences_scored = [(index, (bm25_scores[index]) for index in
top_sentences]
return top_sentences_scored
```

a score between the query term (e.g., the standard term, a query sentence) from standard clauses dictionary 210 and the query term added to the corpus of sentences from user document 202 generated by tokenization engine 206.

The dictionary of standard terms (e.g., dictionary of query sentences 124, standard clauses dictionary 210) that can be used to find relevant terms in user document 202 can be expanded to include term variations having the same meanings. Based on such a configuration, a system (e.g., system 100) can search for a standard condition and in cases of a standard condition not being found in user document 202, Search standard condition module 208 can execute resolution phase 216 after extraction phase 214. An input to resolution phase 216 can be an array of pairs of standard terms. The input can be pairs of similar terms/full sentences. Wherein a sentence from standard clauses dictionary 210 can be similar to more than one sentence from user document 202, a conflict of resolution step can be implemented such that only pairs with the highest normalized relevance score/highest similarity can be selected. For example, the standard term referenced above can be similar to sentence A and sentence C from user document 202, in which case, extraction module 108 can select the pair (e.g., of the standard term and sentence A or the standard term and sentence C) with the highest normalized relevance score. As discussed in one or more embodiments, resolution phase 216 can comprise POS tagging, entity relationship analysis, verb polarity assertion, antonyms/synonyms knowledge-based logic comparison, and implementation of NLP rules for a final assertion, each of which concepts have been described in greater detail with reference to at least FIG. 4. The NLP rules can be a final set of rules that can be used to create a final assertion.

An output of resolution phase 216 can be an array of Booleans indicating "true," if a standard condition represented by the first sentence matches a standard condition represented by the second sentence, and "false," if the standard condition represented by the first sentence does not match the standard condition represented by the second sentence. One or more embodiments discussed herein can be expanded to a variety of solutions, wherein a relevant term can be identified by a relevance score and resolution phase 216 can indicate that the relevant term has more obligations, for example, due to presence of more verbs. Thus, resolution phase 216 can also be used to indicate whether the standard condition represented by the first sentence can be a partial match to the standard condition represented by the second sentence. In one or more embodiments, a system (e.g., system 100) can be used to assert whether two sentences have the same meaning, despite the two sentences not being an exact match. In one or more embodiments, an output of resolution phase 216 can be a result indicating that a sentence from user document 202 can be a partial match to a query sentence from standard clauses dictionary 210 to assert that two sentences have a same meaning despite the two sentences not being an exact match, not being a match, or being an exact match.

Figure 3:
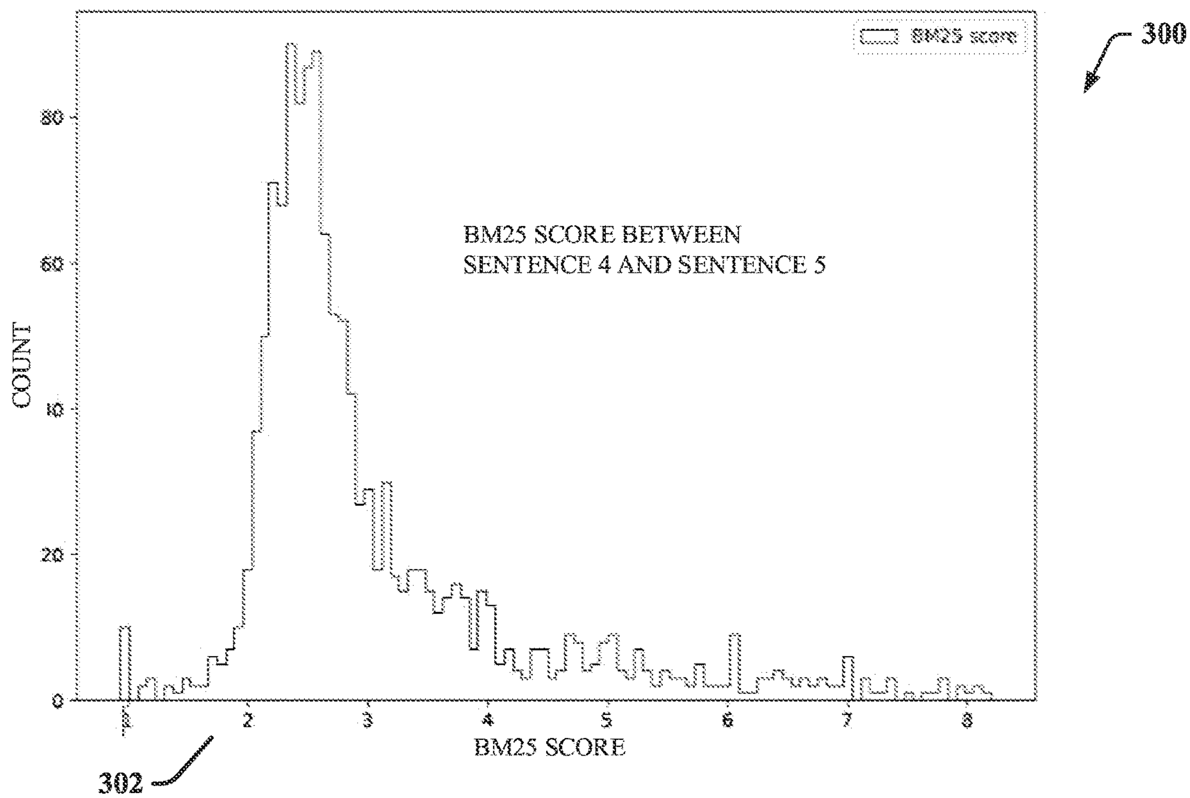
FIG. 3 illustrates example, non-limiting graphs showing unnormalized and normalized relevance scores in accordance with one or more embodiments described herein.
Figure 3:
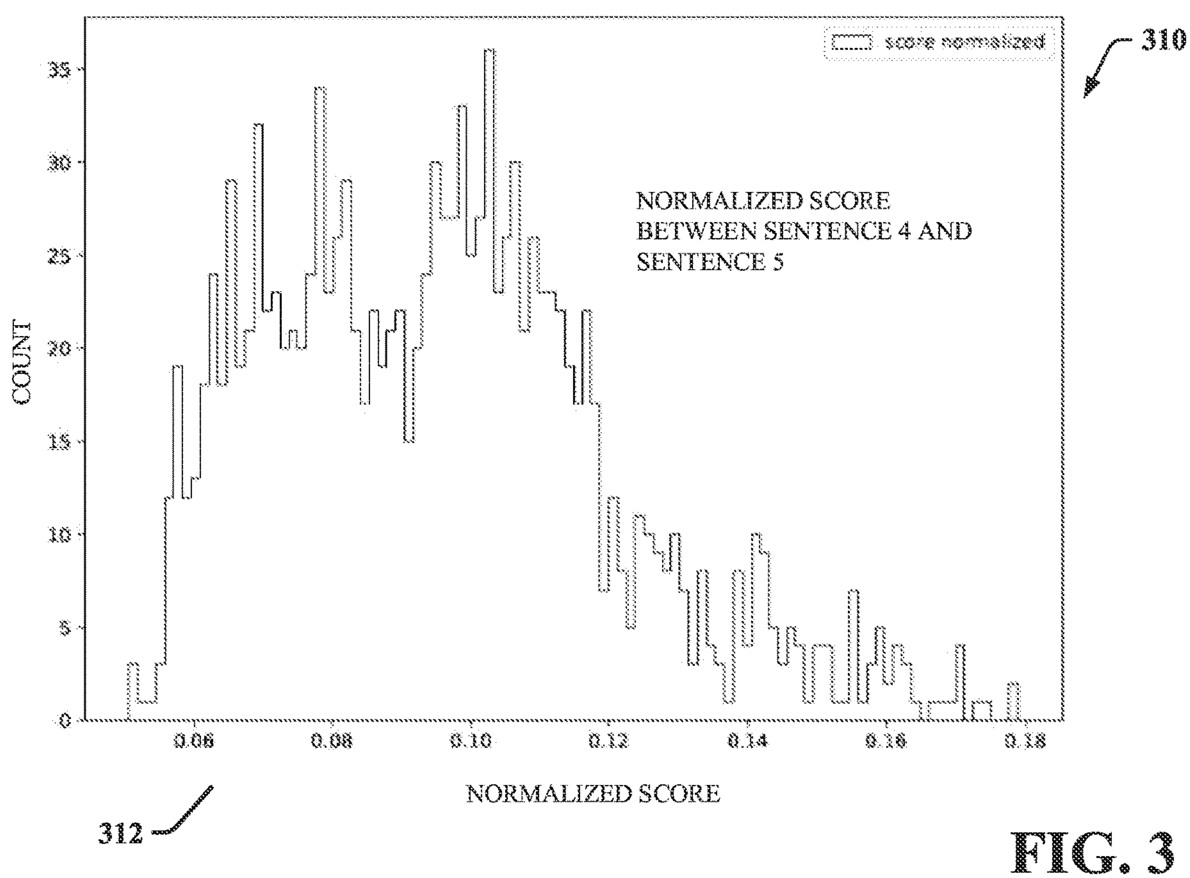

FIG. 3 illustrates example, non-limiting graphs 300 showing unnormalized and normalized relevance scores in accordance with one or more embodiments described herein. One or more embodiments described with respect to FIG. 3 can be implemented by one or more components of system 100 illustrated in FIG. 1. Repetitive description of like elements and/or processes employed in respective embodiments is omitted for sake of brevity.

With continued reference to at least FIG. 2, FIG. 3 illustrates non-limiting graph 300 and non-limiting graph 310, wherein range 302 on the bottom horizontal axis of non-limiting graph 300 can be based on unnormalized relevance scores of sentences and range 312 on the bottom horizontal axis of non-limiting graph 310 can be based on normalized relevance scores of sentences. Thus, non-limiting graph 300 and non-limiting graph 310 can illustrate respective histograms showing a comparison between an unnormalized/non-normalized score (e.g., BM25 score) and a normalized score based on sentence 4 and sentence 5. Range 302 can range up to higher numbers as compared to range 312 based on the relevance score between two sentences (e.g., sentence 4 and sentence 5) and a size of a document (e.g., user document 202) on account of range 302 being based on an unnormalized relevance score. Upon normalization, the relevance score can range from 0 to 1, as indicated by range 312. Assuming that sentence 4 and sentence 5 can be present in user document 202, a relevance score for sentence 4 and sentence 5 can be the MAX(score) (that is, if sentence 4 and/or sentence 5 can be the query sentences).

Sentence 4: The company will not incur these expenses without customer's prior approval.

Sentence 5: In this instance, the company is not obligated to issue a refund or credit for any unused portion of software maintenance.

Figure 4:
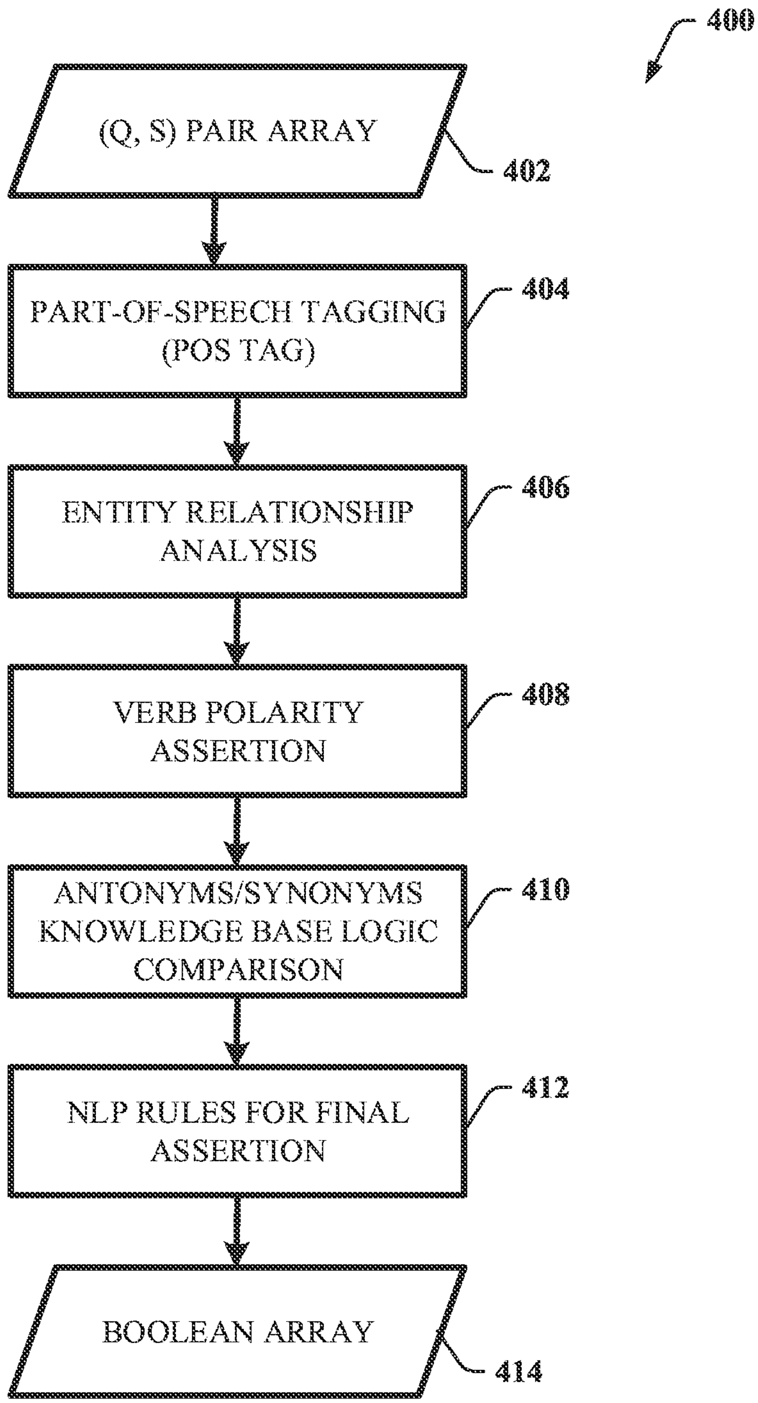
FIG. 4 illustrates a flow diagram of an example, non-limiting method that can be implemented during a resolution phase for automatic assertion of standard conditions that can be present in a document in accordance with one or more embodiments described herein.

FIG. 4 illustrates a flow diagram of an example, non-limiting method 400 that can be implemented during a resolution phase for automatic assertion of standard conditions that can be present in a document in accordance with one or more embodiments described herein. One or more embodiments described with respect to FIG. 4 can be implemented by one or more components of system 100 illustrated in FIG. 1. Repetitive description of like elements and/or processes employed in respective embodiments is omitted for sake of brevity.

Various embodiments of the present disclosure can be implemented towards automatic and explainable deviation or assertion of semantic similarity between sentences, for example, by providing a search engine that can automatically confirm existence of predefined sentences in a user document (e.g., user document 202). The user document can be a physical document, an image (e.g., a scan, a PDF, etc.) of a digital file such as a Microsoft Word file, the digital file, etc. Further, the user document can be a legal contract, a business document (e.g., an RFP, another business document, etc.), a corpus of contracts, and so on, and an entity within an organization can aim to identify whether standard clauses or a set of standard clauses are present in the user document, wherein the standard clauses can be a single sentence or multiple sentences. For example, in the legal domain, reviewers of legal contracts can desire to confirm whether mandatory clauses representing standard conditions exist in a legal contract.

With continued reference to FIG. 2, FIG. 4 can illustrate operations executed as part of non-limiting method 400, for example, during resolution phase 216. Resolution phase 216 can be executed by search standard condition module 208 after extraction phase 214, wherein a set of NLP rules and synonym/antonym dictionary 212 (e.g., linguistic dictionary 126) can be implemented to automatically identify whether a first sentence (e.g., from user document 202) and a second sentence (e.g., from standard clauses dictionary 210) have the same meaning based on a normalized relevance score, computed by extraction module 108 for the first sentence, being above a defined threshold (e.g., a relevance score threshold). The relevance score threshold can be defined by mining similar sentences from user document 202 and standard clauses dictionary 210 (e.g., dictionary of query sentences 124), annotating one or more pairs of relevant sentences and measuring a fall-out metric defined as a proportion of non-relevant documents retrieved out of non-relevant documents available. At 402, resolution phase 216 can receive as input, all pairs of sentences (e.g., (Q,S) pair array) having a normalized relevance score above the relevance score threshold, and assertions can be performed based on grammar, verbs, predicative text, etc., for extracting the standard clause.

At 404, the pairs of sentences having respective normalized relevance scores above the relevance score threshold can be processed by POS tag module 114, wherein POS tag module can tag parts of speech in the pairs of sentences and assert for a number of actions based on a number of verbs in the pairs of sentences. For example, POS tag module 114 can receive an array with pairs of relevant sentences (Q, S) from extraction phase 214 and perform POS tagging, wherein POS tag module 114 can assert for a number of actions due to a number of verbs comprised in each sentence, wherein semantically similar sentences can respectively have the same number of verbs. For example, the first sentence and the second sentence can form a pair of relevant sentences, and POS tag module 114 can tag parts of speech in the first sentence and the second sentence and assert for a number of actions based on a number of verbs in the first sentence and the second sentence. POS tag module 114 can count an amount of verbs in the first sentence and the second sentence and tag words in the first sentence and the second sentence as verbs, adverbs, etc. At 406, entity relationship module 116 can perform named entity recognition (e.g., identifying names of organizations) and noun chunking on the first sentence and the second sentence. Entity relationship module 116 can also perform entity relationship analysis on words comprised in the first sentence and the second sentence to highlight relationships between words.

At 408, verb polarity module 118 can detect verb polarities in the first sentence and the second sentence to assert for changes in the verb polarities. Verb polarity module 118 can used a sentence parser to identify verb polarities. For example, sentence 1 and sentence 2 described with reference to FIG. 1 (and additionally illustrated in FIG. 6 at 600) can respectively belong to a contract (e.g., user document 202) being analyzed for presence of standard conditions and standard clauses dictionary 210. It is to be appreciated that sentence 1 and sentence 2 are exemplary sentences and can illustrate a pair of sentences comprised in the pairs of sentences having a normalized relevance score above the relevance score threshold. The verb "provide" can be considered as having a positive polarity in sentence 1 and a negative polarity in sentence 2, since "provide" is preceded by the word "not" in sentence 2. Verb polarity module 118 can identify the difference in the polarity of the verb "provide" in sentence 1 and sentence 2 to identify a difference in nature of both sentences, for example, from obligation to exclusion. After entity relationship analysis at 406, verb polarity module can tag verb polarities in sentences.

Verb polarity module 118 can use an NLP library for assertion to identify whether a polarity of the verb is an assertion or negation. Checking polarity of verbs can assist with detection of sentences that can be similar in meaning. For example, a machine learning model applied to sentence 1 and sentence 2 without a verb polarity check can mark both sentences as highly similar (e.g., 95% similar) despite the word "provide" having a different polarity in each sentence. However, a polarity change of a verb can change a meaning of a sentence, such as can be evident from sentence 1 and sentence 2. Thus, verb polarity module 118 can prevent semantically dissimilar sentences from being classified as having the same meaning, thereby assisting with identification of standard conditions in a document, despite semantically dissimilar sentences being identical. For example, verb polarity assertion can assist a system (e.g., system 100) to identify the condition " . . . late payments are allowed" instead of the sentence " . . . late payment fees are not allowed."

At 410, logic comparison module 120 can use synonym/antonym dictionary 212 to identify intention changes in the first sentence and the second sentence when the first sentence and the second sentence respectively comprise equal amounts of verbs, adverbs, and adjectives. Linguistic dictionary 126 can be a dictionary of synonyms and antonyms, such as WordNet (Python integrated in Natural Language Toolkit (NLTK)). Sentences can have different meanings either due to changes in polarities of verbs as discussed above, or due words changing from synonyms to antonyms. For example, considering sentence 1 (e.g., first sentence) and sentence 3 (second sentence), the words "provide" and "deny" can be considered as having a positive polarity. Furthermore, sentence 1 and sentence 3 can respectively comprise equal amounts of verbs and adverbs. However, since "deny" can be an antonym of "provide" given the context of the two sentences, sentence 3 can be considered semantically dissimilar to sentence 1 due to the verb "provide" changing from a synonym to an antonym. Thus, logic comparison module 120 can also prevent semantically dissimilar sentences from being classified as having the same meaning, thereby assisting with identification of standard conditions in a document.

Identifying intention changes based on synonym and antonym changes can be based on the concept of Synset (synonym set). A word can have synonyms and antonyms, however a change in a word can be direct or indirect since each synonym of a word can have synonyms and antonyms. For example, a word can have N numbers of synonyms and M numbers of antonyms, and each of the N synonyms can have another set of synonyms. FIG. 7 can illustrate an exemplary net of synonyms and antonyms of a word. As such, a verb in the first sentence can be a direct or indirect synonym or antonym of a verb in the second sentence, and the first sentence can have a different meaning that the second sentence. Logic comparison module 120 can scan the first sentence and the second sentence to assert whether a change in meaning between the two sentences can be attributed to a synonym-to-synonym-to-synonym change or to a synonym-to-antonym change.

At 412, NLP parser 122 can use the set of NLP rules, and at 414 NLP parser 122 can generate a result encoded in an array of Booleans that can indicate whether a first condition in the first sentence matches a second condition in the second sentence. A determination of whether the first condition matches the second condition can be based on conditions selected from a group comprising an amount of target POS words, an intention change due to change in polarity of words, and an intention change due to a change from synonyms to antonyms. For example, NLP parser 122 can assert for results of prior modules (e.g., POS tag module 114, entity relationship module 116, verb polarity module 118, logic comparison module 120) based on equal amounts of target POS tag words (e.g., verbs, adjective, adverbs), change in polarity of verbs, adverbs and adjectives and change in meaning of a sentence due to a word changing from a synonym to an antonym of the word.

In one or more embodiments, the NLP rules can also be applicable to identify changes in numerical values. For example, sentence 7 can be linguistically similar to sentence 6 and have the same nouns, same verbs, etc., but have a different numerical value.

Sentence 6: The amount is due in 30 days.

Sentence 7: The amount is due in 45 days.

In various embodiments discussed herein, resolution phase 216 can employ a different machine learning model than the extraction phase, for example, in case of large language models (LLM) based solutions. For example, a model that can receive two similar sentences and can be asked to compare if the two sentences have the same meaning.

Algorithm 3 can be a pseudo-algorithm of a comparison between a query sentence (query_sentence) and a similar sentence in a user document (corpus_sentence) using NLP rules. In algorithm 3, "query_sentence (str)" can be a sentence from the dictionary of query sentences/dictionary of standard sentences, "corpus_sentence" can be extracted during extraction phase 214 by extraction module 108, "pos_tag" (method) can receive a sentence in string format and return a list of tuples, wherein the first tuple index can be the word and the second tuple index can be the POS tag. Further, "POS_TAG_{index}" can represent a POS of the "word_{index}" such as VERB, ADV, DET, etc., "identify_synonym_to_antonym_change" (method) can receive the list of tuples containing the word and its POS tag and can return "True" if a verb changes to its antonym according to the dictionary of synonyms (e.g., synonym/antonym dictionary 212), "identify_synonym_to_synonym_change" (method) can receive the list of tuples containing the word and its POS tag and return "True" if the verb changes to its synonym according to the dictionary of synonyms (e.g., synonym/antonym dictionary 212).

example, a change of synonym to antonym in adjectives, not illustrated in the exemplary pseudo-code of algorithm 3.

As described in one or more embodiments, an output of resolution phase 216 can be an array of Booleans indicating "true," if a standard condition represented by the first sentence matches a standard condition represented by the second sentence, and "false," if the standard condition represented by the first sentence does not match the standard condition represented by the second sentence. That is, the array of Booleans can indicate "true" for sentences having the same meaning or "false" for sentences not having the same meaning. The array of Booleans can be made to be consumed by other sets of rules, for example, that can be designed to generate an alert if two sentences can be Algorithm 3:

```
1        def nlp_rules(query_sentence, corpus_sentence)
2                query_word_tags = pos_tag(query_sentence)
3                corpus_sentence_tags = pos_tag(corpus_sentence)
2                query_word_tags values: [(word_0, "POS_TAG_0"), (word_1,
"POST_TAG_1") ... ]
3                corpus_sentence_tags vaues: [(word_0, "POS_TAG_0"), (word_1,
"POST_TAG_1") ... ]
4                query_sentence_verbs = [ ]
5                query_sentence_adverbs = [ ]
6                query_sentence_adjectives = [ ]
7                for idx in range(len(query_word_tags)):
8                   if query_word_tags[idx][1] == "VERB":
9                      query_sentence_verbs.append((idx, query_word_tags[idx])):
10                  if query_word_tags[idx][1] == "ADV":
11                        query_sentence_adverbs.append((idx, query_word_tags[idx])):
12                  if query_word_tags[idx][1] == "ADJ":
13                        query_sentence_adverbs.adjectives((idx, query_word_tags[idx])):
           <replicate lines 4 to 13 to fill array of corpus_sentence_verbs,
corpus_sentence_adverbs and corpus_sentence_adjectives>
14               query_sentence_verb_polarities = compute_polarity(query_sentence)
15               corpus_sentence_verb_polarities = compute_polarity(corpus_sentence)
14               query_sentences_verb_polarities values: [(idx, word_i, "positive"), (idx,
word_j, "negative"), etc ... ]
15               corpus_sentence_verb_polarities vaues: [(idx, word_k, "positive"), (idx,
word_l, "negative"), etc ... ]
16               synonym_to_antonym_change_verbs =
identify_synonym_to_antonym_change(query_sentences_verbs, corpus_sentence_verbs)
17               synonym_to_antonym_change_adj =
identify_synonym_to_antonym_change(query_sentence_adjectives, corpus_sentence_adjectives)
18               synonym_to_synonym_net_change = identify_synonym_to_synonym_change
(query_sentences_verbs, corpus_sentence_verbs)
19               if len(query_sentence_verbs) == len(corpus_sentnece_verbs) and \
20                    len(query_sentence_adverbs) == len(corpus_sentence_adverbs) and \
21                    len(query_sentence_adjectives) == len(corpus_sentence_adjectives):
22                  if set(query_sentences_verb_polarities) !=
set(corpus_sentence_verb_polarities):
23                           return False
24                  if synonym_to_antonym_change_verbs or
synonym_to_antonym_change_adj:
25                        return False
26                  if set(query_sentence_verbs) != set(corpus_sentence_verbs) and
synonym_to_synonym_net_change:
27                        return True
28                  if set(query_sentence_verbs) == set(corpus_sentence_verbs):
29                        return True
30          return False
```

It is to be noted that in algorithm 3, lines 2, 3, 14 and 15 are repeated, indicating that the object can be an array of tuples. The method named "nlp_rules" can be called for all pairs of sentences selected during extraction phase 214, and results of the method can be stored in an array of "True" and "False," according to an output of "nlp_rules." The pseudo-code described in algorithm 3 can illustrate that a combination of POS tag words, verb polarities and a synonym/antonym net can be used to automatically assert if two similar sentences have the same meaning. Code variations can be adapted according to a type of data such as, for indicated as "false" (e.g., unlikely to have the same meaning). Further, an interface can be designed that can indicate that two sentences are similar but do not have the same meaning or that the two sentences are similar and have the same meaning. The Boolean array can be made to be consumed by an interface for a user to visually see results.

FIG. 5 illustrates an example, non-limiting graph 500 showing POS tagging and entity relationship analysis of tokens in accordance with one or more embodiments described herein. One or more embodiments described with respect to FIG. 5 can be implemented by one or more components of system 100 illustrated in FIG. 1. Repetitive description of like elements and/or processes employed in respective embodiments is omitted for sake of brevity.

With continued reference to at least FIG. 4, non-limiting graph 500 illustrates POS tags that can be generated (e.g., by POS tag module 114) for a sentence. Non-limiting graph 500 further illustrates relationships that can be identified (e.g., entity relationship module 116) between words in the sentence. It is to be appreciated that non-limiting graph 500 is exemplary, and additional POS tags and relationships, such as not illustrated in non-limiting graph 500, can be detected in a sentence.

In the sentence illustrated in FIG. 5, the words "this" and "a" can be tagged by the POS tag "DET," indicating that the words are determiners, the word "is" can be tagged as "VERB," indicating that the word is a verb, and the word "question" can be tagged as "NOUN," indicating that the word is a noun. At 502, a relationship between the words "this" and "is" can be labelled as "nsubj," indicating a nominal subject relationship. At 504, a relationship between the words "is" and "question" can be labelled as "attr," indicating an attribute-based relationship. At 506, a relationship between the words "a" and "question" can be labelled as "det," indicating a determiner-based relationship.

Figure 6:
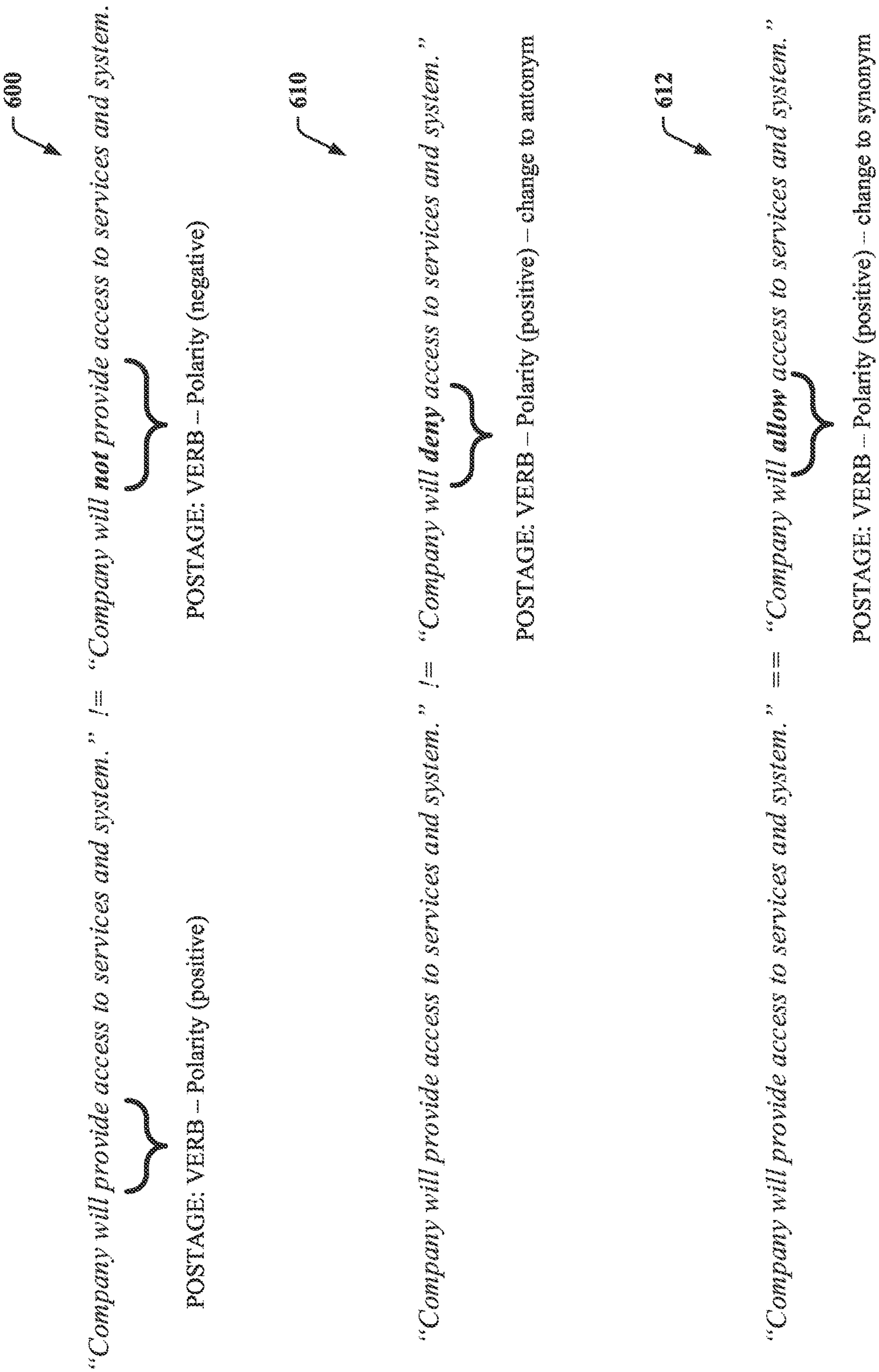
FIG. 6 illustrates example, non-limiting sentence pairs with verb polarity changes and semantic changes in accordance with one or more embodiments described herein.

FIG. 6 illustrates example, non-limiting sentence pairs 600, 610 and 612 with verb polarity changes and semantic changes in accordance with one or more embodiments described herein. One or more embodiments described with respect to FIG. 5 can be implemented by one or more components of system 100 illustrated in FIG. 1. Repetitive description of like elements and/or processes employed in respective embodiments is omitted for sake of brevity.

With continued reference to at least FIGS. 2 and 4, sentence pair 600, sentence pair 610 and sentence pair 612 illustrate POS tags that can be generated (e.g., by POS tag module 114) for a sentence. Sentence pairs 600, 610 and 612 further illustrate verb polarities that can be detected (e.g., verb polarity module 118) in a sentence. In an embodiment, sentence pairs 600, 610 and 612 can be pairs of sentences having a normalized relevance score above a defined threshold (e.g., relevance score threshold) that can be processed by resolution module 110 (e.g., during resolution phase 216 in FIG. 2) to identify whether individual sentences in a pair of sentences can be semantically similar. For example, a user or entity in an organization can aim to identify whether a standard condition (e.g., a query sentence), such as represented by the sentence on the left-hand side in sentence pairs 600, 610 and 612, can be present in a document or contract (e.g., user document 202).

The sentences on the right-hand side in sentence pairs 600, 610 and 612 can represent sentences present in the document or contract. Sentence pairs 600, 610 and 612 can be received (e.g., by resolution phase 216) as part of an array with pairs of relevant sentences (Q, S). POS tag module 114 can identify POS tags on each sentence in a pair. Thus, POS tag module can assign the POS tag "VERB" to the words "provide," "deny" and "allow" in respective sentence pairs 600, 610 and 612. Thereafter, entity relationship analysis can be performed on each sentence (e.g., entity relationship module 116).

Verb polarity module 118 can detect polarities of the verbs identified by POS tag module 114 in each sentence. For example, in sentence pair 600, the verb "provide" can be assigned a positive polarity in the sentence on the left-hand side, whereas the verb "provide" can be assigned a negative polarity in the sentence on the right-hand side due to the word being preceded by the word "not." Similarly, in sentence pair 610, the verb "deny" can be assigned a positive polarity, and in sentence pair 612, the word "allow" can be assigned a positive polarity. As such, verb polarity module 118 can assert for a change in polarity of verbs, wherein the assertion can be the detection of an equality of polarity values of two verbs. For example, the verb "provide" in sentence pair 600 can have an affirmative polarity in the sentence on the left-hand side and a negative polarity in the sentence on the right hand side, the verbs "provide" and "deny" in sentence pair 610 can respectively have affirmative polarities and the verbs "provide" and "allow" in sentence pair 612 can respectively have affirmative polarities.

Logic comparison module 120 can use synonym/antonym dictionary 212 to identify intention changes in pairs of sentences when both sentences in a pair of sentences respectively comprise equal amounts of verbs, adverbs, and adjectives. For example, logic comparison module 120 can identify that in sentence pair 610, the verb "deny" can indicate a change to an antonym of the word "provide." Likewise, logic comparison module 120 can identify that in sentence pair 612, the verb "allow" can indicate a change to a synonym of the word "provide." As stated elsewhere herein, sentences can have different meanings either due to changes in polarities of verbs as discussed above, or due to a change from synonyms to antonyms. Further, similar sentences can have different meanings. For example, sentence pair 600 can have a similarity score of 0.96, sentence pair 610 can have a similarity score of 0.79 and sentence pair 612 can have a similarity score of 0.82, however, the individual sentences in each sentence pair can have the meaning or a different meaning, regardless of the similarity score. Thus, detecting changes in polarities of verbs as well as changes in a verb to a synonym or antonym of the verb can prevent detection of semantically dissimilar sentences as semantically similar. While it can be possible that individual sentences in a pair of sentences can respectively comprise different amounts of verbs, adverbs and adjectives, asserting for equal amounts of verbs, adverbs and adjectives can increase chances of detecting similar sentences having the same meaning.

Listed below is a set of exemplary sentences from historical documents and real cases that can further emphasize how semantically identical sentences expressing the same concept can be expressed in different ways. Such sentences can be collected and added to standard clauses dictionary 210 that can be used for extraction of semantically similar sentences (e.g., during extraction phase 214 of FIG. 2) from a document. For example, wherein a machine learning model employed to extract similar sentences can identify a payment term that can be semantically similar to a query term, the payment term can be considered a standard payment term, otherwise, a non-standard payment term.

TABLE 1

| Set of exemplary sentences having the same meaning | |
|---|---|
| 1. | 'Amounts are due upon receipt of the invoice and payable within 30 days of the invoice date to an account.' |
| 2. | 'Amount(s) are due upon receipt of the invoice and payable within 30 days of the invoice date.' |
| 3. | 'Amounts are due upon receipt of the invoice and payable within 30 (thirty) days of the invoice date.' |
| 4. | 'Amounts are due upon receipt of the invoice and payable within (thirty) 30 days of the invoice date.' |
| 5. | 'Charges are due upon receipt of the invoice and payable within 30 days of the invoice date.' |

FIG. 7 illustrates an example, non-limiting representation of a synonym/antonym space 700 that can be leveraged to identify an intention change between sentences in accordance with one or more embodiments described herein. One or more embodiments described with respect to FIG. 7 can be implemented by one or more components of system 100 illustrated in FIG. 1. Repetitive description of like elements and/or processes employed in respective embodiments is omitted for sake of brevity.

As discussed in one or more embodiments herein, a linguistic dictionary (e.g., linguistic dictionary 126, synonym/antonym dictionary 212) can be used (e.g., by logic comparison module 120) to identify intention changes in individual sentences of a pair of sentences when both sentences in a pair of sentences can respectively comprise equal amounts of verbs, adverbs, and adjectives. Sentences can have different meanings either due to change in polarity of a verb, or due to a change from synonyms to antonyms. For example, a verb in one sentence can be a synonym of verb in another sentence or an antonym of the verb in the other sentence, causing the two sentences to have different meaning.

For example, a word can have synonyms and antonyms, however a change in a word can be direct or indirect since each synonym of a word can have synonyms and antonyms. For example, a word can have N numbers of synonyms and M numbers of antonyms, and each of the N synonyms can have another set of synonyms. Thus, a change in meaning of sentences can be attributed to a synonym-to-synonym-to-synonym change or to a synonym-to-antonym change.

Synonym/antonym space 700 illustrates word 702. Word 702 can have antonyms 704 comprising antonyms 706 (e.g., antonym_1), 708 (e.g., antonym_2), . . . , 710 (e.g., antonym_M). Word 702 can also have first level synonyms 714 comprising synonyms 716 (e.g., synonym_1), 718 (e.g., synonym_2), . . . , 720 (e.g., synonym_N). Further, each of first level synonyms 714 can have antonyms. For example, synonym 716 can have antonyms 722 comprising antonyms 724 (e.g., antonym_1), 726 (e.g., antonym_2), . . . , 728 (e.g., antonym_M), synonym 720 can have antonyms 732 comprising antonyms 734 (e.g., antonym_1), 736 (e.g., antonym_2), . . . , 738 (e.g., antonym_M), and synonym 718 can have antonyms 730. Each of first level synonyms 714 can also have additional synonyms which can be second level synonyms 740 of word 702. For example, synonym 716 can have synonyms 742 (e.g., synonym_1, synonym_2, . . . , synonym X), synonym 718 can have synonyms 744 (e.g., synonym_1, synonym_2, . . . , synonym Y) and synonym 720 can have synonyms 746 (e.g., synonym_1, synonym_2, . . . , synonym Z). It is to be appreciated that the net of synonyms and antonyms represented by synonym/antonym space 700 can be associated with the linguistic dictionary.

FIG. 8A illustrates an example, non-limiting representation 800 of a Boolean array indicating whether two sentences are a semantic match in accordance with one or more embodiments described herein. One or more embodiments described with respect to FIG. 8A can be implemented by one or more components of system 100 illustrated in FIG. 1. Repetitive description of like elements and/or processes employed in respective embodiments is omitted for sake of brevity.

With continued reference to at least FIGS. 2 and 4, an output of resolution phase 216 can be an array of Booleans indicating "true," if a standard condition represented by a first sentence from user document 202 can be detected as matching a standard condition represented by a second sentence from standard clauses dictionary 210, and "false," if the standard condition represented by the first sentence can be detected as matching the standard condition represented by the second sentence. That is, the array of Booleans can indicate "true" if sentences have the same meaning or "false" if the sentences do not have the same meaning. For example, the leftmost column of the table in FIG. 8A, can indicate two sentences from standard clauses dictionary 210 (with a first sentence corresponding to row 1 and a second sentence corresponding to rows 2 and 3). Further, the third column of the table in FIG. 8A can indicate three sentences from user document 202 (with a first sentence corresponding to row 1 and the first sentence from standard clauses dictionary 210, and a second and a third sentence respectively corresponding to rows 2 and 3 and the second sentence from standard clauses dictionary 210). A user or another entity can upload user document 202 in a system (e.g., system 100) and the system can scan user document 202 for automatic sentence condition matching using a machine learning model. As such, a sentence from standard clauses dictionary 210 and a corresponding sentence from user document 202 can comprise similarities and differences, as indicated by the markings in the second and third columns of row 3 of the table in FIG. 8A.

Wherein the pair of sentences listed in row 1 can be identified as being the same in standard clauses dictionary 210 and user document 202, the array of Booleans can indicate "true" as illustrated by the symbol in the rightmost column of FIG. 8A without generating any warning to a user. Similarly, wherein the pair of sentences listed in row 2 can be identified as being identical in standard clauses dictionary 210 and user document 202, the array of Booleans can indicate "true" as illustrated by the symbol in the rightmost column of FIG. 8A without generating any warning to a user. However, wherein the pair of sentences listed in row 3 can be identified as being unidentical in standard clauses dictionary 210 and user document 202, the array of Boolean can indicate "false" while generating a warning to a user, as illustrated by the symbol in the rightmost column of FIG. 8A. For example, a user can be warned that one extra commitment can be identified in the sentence from user document 202 and the system can request the user to review and validate.

Figure 8B:
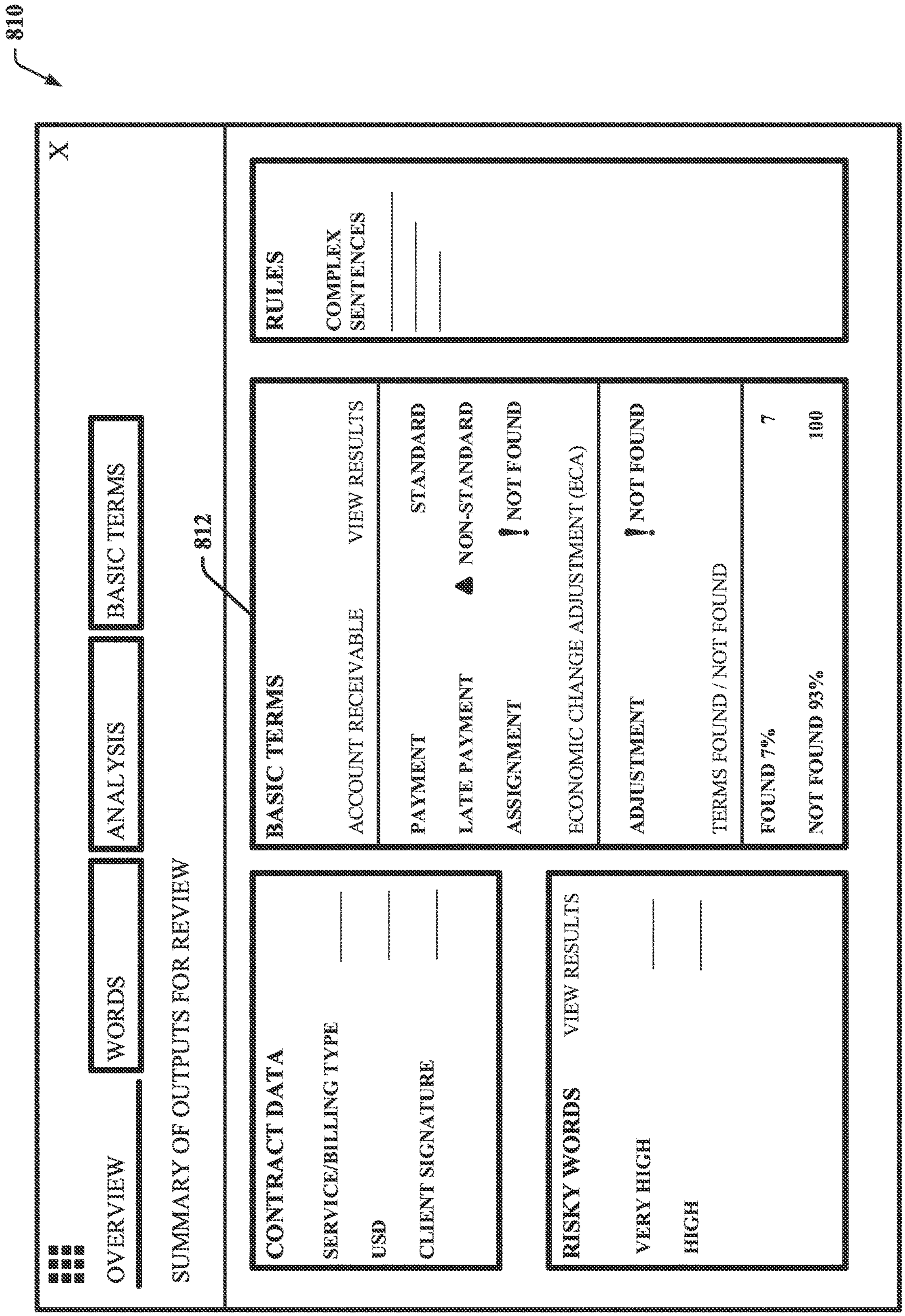
FIG. 8B illustrates an example, non-limiting representation of a graphical user interface (GUI) for displaying results in accordance with one or more embodiments described herein.

FIG. 8B illustrates an example, non-limiting representation of a GUI 810 for displaying results in accordance with one or more embodiments described herein. One or more embodiments described with respect to FIG. 8B can be implemented by one or more components of system 100 illustrated in FIG. 1. Repetitive description of like elements and/or processes employed in respective embodiments is omitted for sake of brevity.

With continued reference to FIG. 8A, the array of Booleans can be made to be consumed by other sets of rules, for example, that can be designed to generate an alert if two sentences are indicated "false" (e.g., unlikely to have the same meaning). Further, an interface, such as GUI 810 can be designed that can indicate that two sentences are similar but do not have the same meaning or that the two sentences are similar and have the same meaning. The Boolean array can be made to be consumed by GUI 810 for a user to visually see results of an automatic sentence condition match operation executed by one or more embodiments herein.

Various embodiments discussed herein can be directed towards turning data structures by language into labels. For example, as illustrated at 812, the term "invoice payment" can be identified by a system (e.g., system 100) as a standard term, the term "late-payment" can be identified by the system as a non-standard term, and the term "assignment" can be identified by the system as a missing term, as indicated by the label "not found" at 812. Further, GUI 810 can indicate a percentage of terms found and a percentage of terms not-found. As such, various embodiments discussed herein can convert text in a contract (e.g., user document 202) to labels that can be found present or absent in a standard (e.g., dictionary of query sentences 124, standard clauses dictionary 210).

Figure 9:
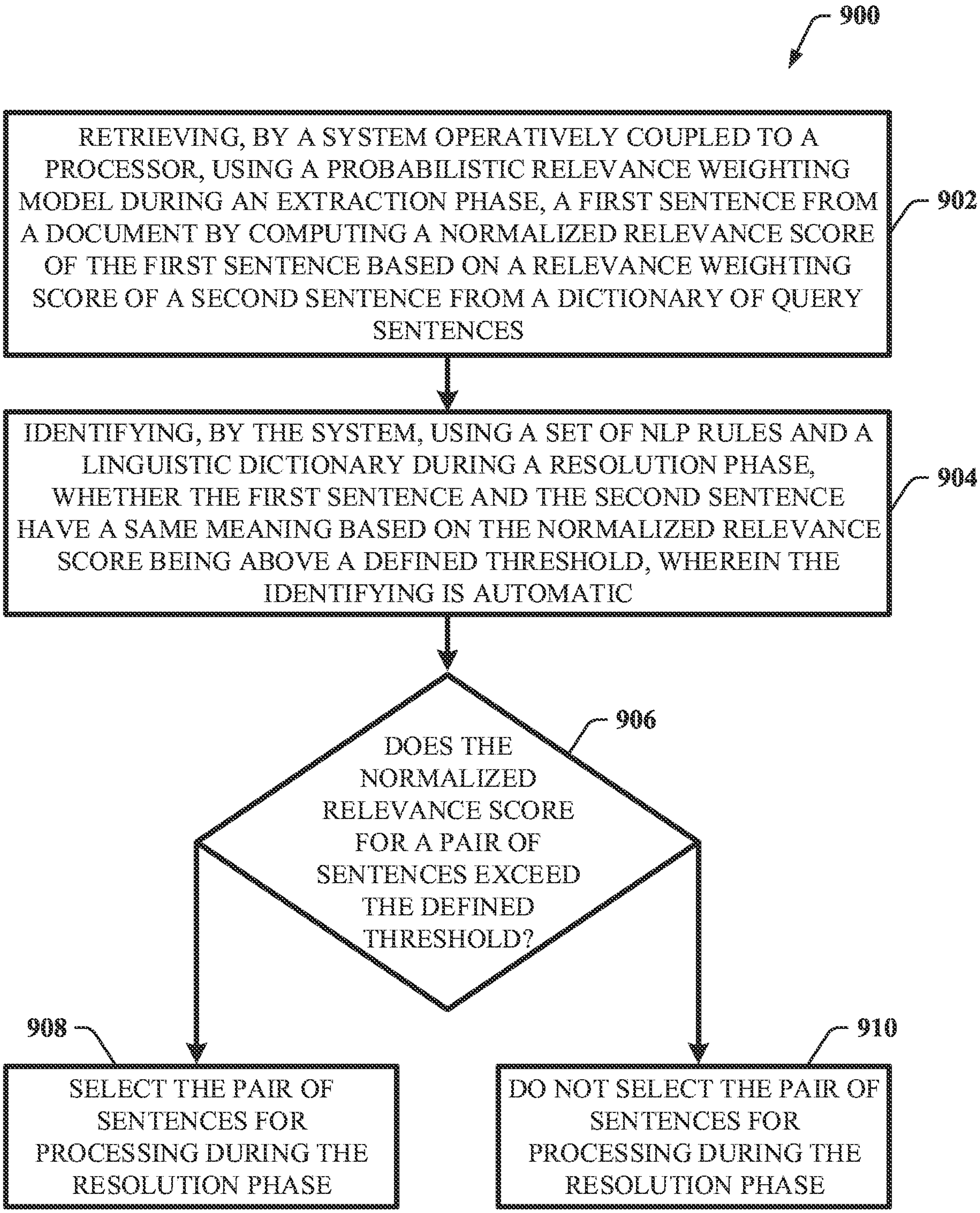
FIG. 9 illustrates a flow diagram of an example, non-limiting method that can automatically assert whether standard conditions are present in a document by using similarity and NLP in accordance with one or more embodiments described herein.

FIG. 9 illustrates a flow diagram of an example, non-limiting method 900 that can automatically assert whether standard conditions are present in a document by using similarity and NLP in accordance with one or more embodiments described herein. Repetitive description of like elements and/or processes employed in respective embodiments is omitted for sake of brevity.

At 902, the non-limiting method 900 can comprise retrieving (e.g., by extraction module 108), by a system operatively coupled to a processor, using a probabilistic relevance weighting model during an extraction phase, a first sentence from a document by computing a normalized relevance score of the first sentence based on a relevance weighting score of a second sentence from a dictionary of query sentences.

At 904, the non-limiting method 900 can comprise identifying (e.g., by extraction module 108), by the system, using a set of NLP rules and a linguistic dictionary during a resolution phase, whether the first sentence and the second sentence have a same meaning based on the normalized relevance score being above a defined threshold, wherein the identifying can be automatic.

At 906, the non-limiting method 900 can comprise determining (e.g., by extraction module 108), by the system, whether the normalized relevance score for a pair of sentences (e.g., comprising the first sentence and the second sentences) exceeds a defined threshold.

If yes, at 908, the non-limiting method 900 can comprise selecting the pair of sentences for processing during the resolution phase.

If no, at 910, the non-limiting method 900 can comprise not selecting the pair of sentences for processing during the resolution phase.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively identify whether a standard condition is present in a document or a large corpus of documents as the one or more embodiments described herein can enable this process. And, neither can the human mind nor a human with pen and paper retrieve a first sentence from a document by weighting relevance of a word in a second sentence from a dictionary of query sentences using IDF, as conducted by one or more embodiments described herein.

An advantage of the systems, computer-implemented methods and/or computer-program products disclosed herein can include automatic assertion of standard terms, standard clauses and/or standard conditions in a document, based on a machine learning model having accuracy above a defined threshold. That is, various embodiments described herein can detect presence or absence of standard terms, standard clauses and/or standard conditions in a document based on a query term, without needing human supervision and without relying on the standard terms, standard clauses and/or standard conditions being an exact match to the query term, wherein the standard terms, standard clauses and/or standard conditions can have the same meaning as the query term. As stated elsewhere herein, the various embodiments described herein can also enable normalization of a relevance score used to retrieve relevant sentences from a document, wherein normalization of the relevance score can allow for a relevance score threshold to be set in the range of 0 to 1.

Figure 10:
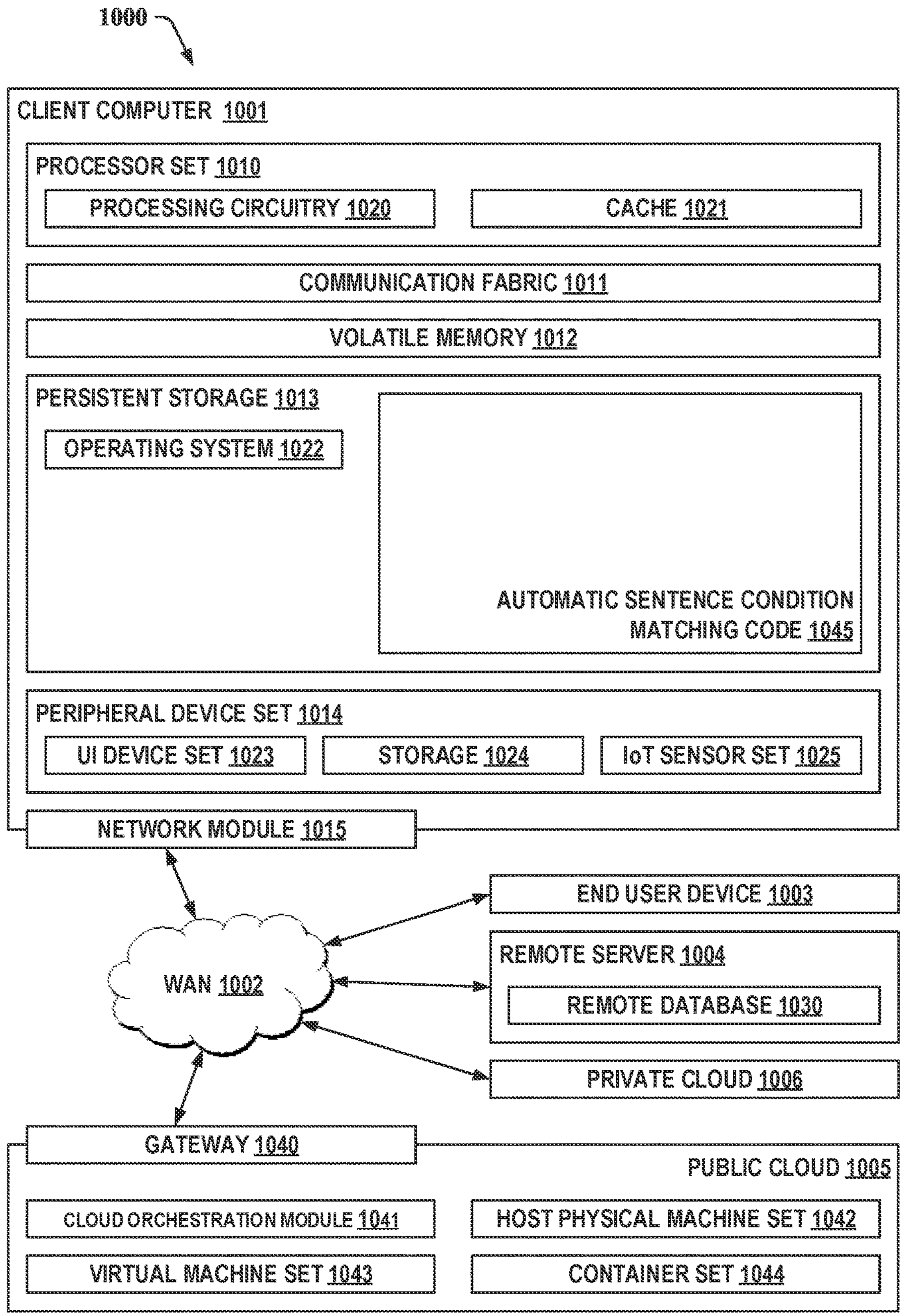
FIG. 10 illustrates a block diagram of an example, non-limiting operating environment in which one or more embodiments described herein can be facilitated.

FIG. 10 illustrates a block diagram of an example, non-limiting operating environment 1000 in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as automatic sentence condition matching code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer-executable components; and a processor that executes the computer-executable components stored in the memory, wherein the computer-executable components comprise:

an extraction module that uses a probabilistic relevance weighting model distinct from neural embedding similarity models to perform an extraction phase that programmatically filters a document corpus to a bounded candidate set by retrieving a first sentence from a document by computing a normalized relevance score of the first sentence based on a relevance weighting score of a second sentence from a dictionary of query sentences; and a resolution module that executes subsequent to the extraction phase and operates only on the bounded candidate set of sentences using a set of natural language processing (NLP) rules and a linguistic dictionary to automatically identify whether the first sentence and the second sentence have a same meaning based on the normalized relevance score being above a defined threshold, wherein the identifying produces a machine-readable Boolean result that controls downstream programmatic processing by enabling or suppressing further automated analysis of the document.

2. The system of claim 1, further comprising:

a preparation engine that performs object character recognition (OCR) and tokenization on the document, wherein the document is processed by the extraction module and the resolution module after the OCR and the tokenization.

3. The system of claim 1, wherein retrieving the first sentence from the document comprises inverse document frequency, and wherein the probabilistic relevance weighting model is a sentence ranking and retrieval function that considers a distribution of index words of a sentence for retrieving the first sentence.

4. The system of claim 1, wherein the defined threshold is defined by mining similar sentences from the document and the dictionary of query sentences, annotating one or more pairs of relevant sentences and measuring a fall-out metric defined as a proportion of non-relevant documents retrieved out of non-relevant documents available.

5. The system of claim 1, further comprising:

a part-of-speech (POS) tag module that tags parts of speech in the first sentence and the second sentence, and that asserts a number of actions based on an amount of verbs in the first sentence and the second sentence.

6. The system of claim 1, further comprising:

an entity relationship module that performs named entity recognition and noun chunking on the first sentence and the second sentence.

7. The system of claim 1, further comprising:

a verb polarity module that detects verb polarities in the first sentence and the second sentence to assert for changes in the verb polarities.

8. The system of claim 1, further comprising:

a logic comparison module that uses the linguistic dictionary to identify intention changes in the first sentence and the second sentence when the first sentence and the second sentence respectively comprise same amounts of verbs, adverbs, and adjectives, wherein the linguistic dictionary is a dictionary of antonyms and synonyms.

9. The system of claim 1, further comprising:

an NLP parser that uses the set of NLP rules to generate a result encoded in an array of Booleans indicating whether a first condition in the first sentence matches a second condition in the second sentence.

10. The system of claim 9, wherein a determination whether the first condition matches the second condition is based on conditions selected from a group comprising an amount of target POS words, an intention change due to change in polarity of words, and an intention change due to a change from synonyms to antonyms.

11. A computer-implemented method, comprising:

retrieving, by a system operatively coupled to a processor, using a probabilistic relevance weighting model distinct from neural embedding similarity models to perform an extraction phase that programmatically filters a document corpus to a bounded candidate set by retrieving a first sentence from a document by computing a normalized relevance score of the first sentence based on a relevance weighting score of a second sentence from a dictionary of query sentences; and identifying, by the system, executing subsequent to the extraction phase and operating only on the bounded candidate set of sentences, using a set of natural language processing (NLP) rules and a linguistic dictionary during a resolution phase, whether the first sentence and the second sentence have a same meaning based on the normalized relevance score being above a defined threshold, wherein the identifying is automatic, and wherein the identifying produces a machine-readable Boolean result that controls downstream programmatic processing by enabling or suppressing further automated analysis of the document.

12. The computer-implemented method of claim 11, further comprising:

performing, by the system, OCR and tokenization on the document, wherein the document is processed via the extraction phase and the resolution phase after the OCR and the tokenization.

13. The computer-implemented method of claim 11, wherein the retrieving the first sentence from the document comprises inverse document frequency, and wherein the probabilistic relevance weighting model is a sentence ranking and retrieval function that considers a distribution of index words of a sentence for retrieving the first sentence.

14. The computer-implemented method of claim 11, wherein the defined threshold is defined by mining similar sentences from the document and the dictionary of query sentences, annotating one or more pairs of relevant sentences and measuring a fall-out metric defined as a proportion of non-relevant documents retrieved out of non-relevant documents available.

15. The computer-implemented method of claim 11, further comprising:

tagging, by the system, parts of speech in the first sentence and the second sentence; and asserting, by the system, a number of actions based on an amount of verbs in the first sentence and the second sentence.

16. The computer-implemented method of claim 11, further comprising:

performing, by the system, named entity recognition and noun chunking on the first sentence and the second sentence; and detecting, by the system, verb polarities in the first sentence and the second sentence to assert for changes in the verb polarities.

17. The computer-implemented method of claim 11, further comprising:

identifying, by the system, using the linguistic dictionary, intention changes in the first sentence and the second sentence when the first sentence and the second sentence respectively comprise same amounts of verbs, adverbs, and adjectives, wherein the linguistic dictionary is a dictionary of antonyms and synonyms.

18. The computer-implemented method of claim 11, further comprising:

generating, by the system, using the set of NLP rules, a result encoded in an array of Booleans indicating whether a first condition in the first sentence matches a second condition in the second sentence.

19. A computer program product for programmatic assertion of a standard condition search, the computer program product comprising a non-transitory computer readable storage medium having program instructions embodied therewith, the program instructions executable by a processor to cause the processor to:

retrieve, by the processor, using a probabilistic relevance weighting model distinct from neural embedding similarity models to perform an extraction phase that programmatically filters a document corpus to a bounded candidate set of sentences by retrieving a first sentence from a document by computing a normalized relevance score of the first sentence based on a relevance weighting score of a second sentence from a dictionary of query sentences; and identify, by the processor, executing subsequent to the extraction phase and operating only on the bounded candidate set, using a set of natural language processing (NLP) rules and a linguistic dictionary during a resolution phase, whether the first sentence and the second sentence have a same meaning based on the normalized relevance score being above a defined threshold, wherein the identifying is automatic, and wherein the identifying produces a machine-readable Boolean result that controls downstream programmatic processing by enabling or suppressing further automated analysis of the document.

20. The computer program product of claim 19, wherein the program instructions are further executable by the processor to cause the processor to:

perform, by the processor, OCR and tokenization on the document, wherein the document is processed via the extraction phase and the resolution phase after the OCR and the tokenization.

* * * * *